(12) United States Patent
Heckmeier et al.

(10) Patent No.: US 7,662,443 B2
(45) Date of Patent: *Feb. 16, 2010

(54) LIQUID-CRYSTALLINE MEDIUM

(75) Inventors: Michael Heckmeier, Bensheim (DE); Brigitte Schuler, Grossostheim (DE); Martin Engel, Darmstadt (DE); Peer Kirsch, Darmstadt (DE); Matthias Bremer, Darmstadt (DE)

(73) Assignee: Merck Patent Gesellschaft mit Beschraenkter Haftung, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/944,542

(22) Filed: Nov. 23, 2007

(65) Prior Publication Data

US 2008/0121843 A1 May 29, 2008

Related U.S. Application Data

(62) Division of application No. 10/270,118, filed on Oct. 15, 2002, now Pat. No. 7,303,791.

(30) Foreign Application Priority Data

Oct. 12, 2001 (DE) ................. 101 50 198

(51) Int. Cl.
    C09K 19/30 (2006.01)
    C09K 19/34 (2006.01)
    C09K 19/32 (2006.01)
    C09K 19/12 (2006.01)

(52) U.S. Cl. ............... 428/1.1; 252/299.61; 252/299.62; 252/299.63; 252/299.66

(58) Field of Classification Search .................. 428/1.1; 252/299.01, 299.61, 299.62, 299.63, 299.66
    See application file for complete search history.

(56) References Cited

U.S. PATENT DOCUMENTS

| | | | |
|---|---|---|---|
| 5,087,764 A * | 2/1992 | Reiffenrath et al. .......... 568/656 |
| 5,714,087 A | 2/1998 | Pausch et al. | |
| 6,399,164 B1 * | 6/2002 | Yanai et al. ................... 428/1.1 |
| 6,764,723 B2 | 7/2004 | Lee et al. | |
| 6,808,764 B2 | 10/2004 | Heckmeier et al. | |
| 6,827,990 B2 | 12/2004 | Heckmeier et al. | |
| 6,844,032 B2 * | 1/2005 | Miyazawa et al. ............ 428/1.1 |
| 6,890,607 B2 | 5/2005 | Heckmeier et al. | |
| 6,908,645 B2 | 6/2005 | Kirsch et al. | |
| 6,962,733 B2 | 11/2005 | Heckmeier et al. | |
| 6,964,794 B2 | 11/2005 | Heckmeier et al. | |
| 7,001,646 B2 | 2/2006 | Heckmeier et al. | |
| 7,056,561 B2 | 6/2006 | Heckmeier et al. | |
| 7,105,210 B2 | 9/2006 | Heckmeier et al. | |
| 7,135,210 B2 | 11/2006 | Kirsch et al. | |
| 7,303,791 B2 * | 12/2007 | Heckmeier et al. .......... 428/1.1 |
| 2003/0197153 A1 | 10/2003 | Heckmeier et al. | |

FOREIGN PATENT DOCUMENTS

| | | |
|---|---|---|
| EP | 387032 | 3/1990 |
| JP | 2000-192040 | 7/2000 |
| JP | 2001-31972 | * 2/2001 |
| WO | WO 01/46336 | 6/2001 |

OTHER PUBLICATIONS

English abstract for JP 2001-31972, 2001.*
English Translation b computer for JP 2000-192040 (on internet @ http//www4.ipdl.jpo.go.jp/Tokjitu/PAJdetail.ipd?N0000=60 &N0120=01&N2001=N3001=2000-192040 ).

* cited by examiner

*Primary Examiner*—Shean C Wu
(74) *Attorney, Agent, or Firm*—Millen, White, Zelano & Branigan, P.C.

(57) ABSTRACT

The invention relates to a liquid-crystalline medium comprising at least one compound of the formula I

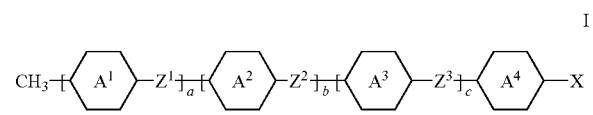

in which

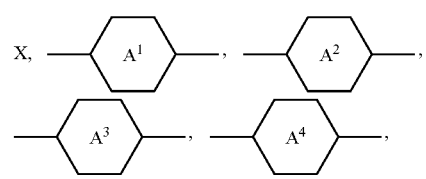

$Z^1$, $Z^2$, $Z^3$, a, b and c are as defined in claim 1, and to electro-optical displays containing a liquid-crystalline medium of this type.

12 Claims, No Drawings

LIQUID-CRYSTALLINE MEDIUM

This application is a divisional of U.S. Ser. No. 10/270,118, filed Oct. 15, 2002, now U.S. Pat. No. 7,303,791, issued Dec. 4, 2007, which claims the benefits of DE 10150198.6, filed Oct. 12, 2001, and is incorporated by reference herein.

The present invention relates to a liquid-crystalline medium, to the use thereof for electro-optical purposes, and to displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out world-wide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The TFT displays usually operate as TN cells with crossed polarizers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

In addition to liquid-crystal displays which use back-lighting, i.e. are operated transmissively and if desired transflectively, reflective liquid-crystal displays are also particularly interesting. These reflective liquid-crystal displays use the ambient light for information display. They thus consume significantly less energy than back-lit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation ($d \cdot \Delta n$). This low optical retardation results in usually acceptable low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:
extended nematic phase range (in particular down to low temperatures)
the ability to switch at extremely low temperatures (outdoor use, automobile, avionics)
increased resistance to UV radiation (longer service life)
low optical birefringence for small layer thicknesses
low threshold voltage.

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention has an object of providing media, in particular for MLC, TN or STN displays of this type, which do not have the above-mentioned disadvantages or only do so to a reduced extent, and preferably simultaneously have very high specific resistances and low threshold voltages. This object requires liquid-crystalline compounds which have a high clearing point and low rotational viscosity. Upon further study of the specification and appended claims, further objects and advantages of this invention will become apparent to those skilled in the art.

It has now been found that these and other objects can be achieved if use is made of the liquid-crystalline compound which has a terminal polar radical and a terminal $CH_3$ group. The compounds of the formula I reduce the elastic constants, in particular $K_1$, and result in mixtures having particularly low threshold voltages.

The invention thus relates to a liquid-crystalline medium based on a mixture of polar compounds of positive or negative dielectric anisotropy, comprising one or more compounds of the formula

I

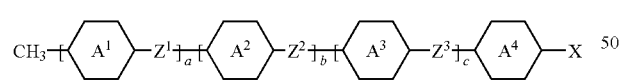

in which

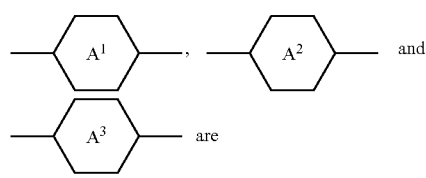

a) a 1,4-cyclohexenylene or 1,4-cyclohexylene radical, in which one or two non-adjacent $CH_2$ groups may be replaced by —O— or —S—, b) a 1,4-phenylene radical, in which one or two CH groups may be replaced by N, c) a radical from the group consisting of piperidine-1,4-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) may be monosubstituted or polysubstituted by halogen atoms,

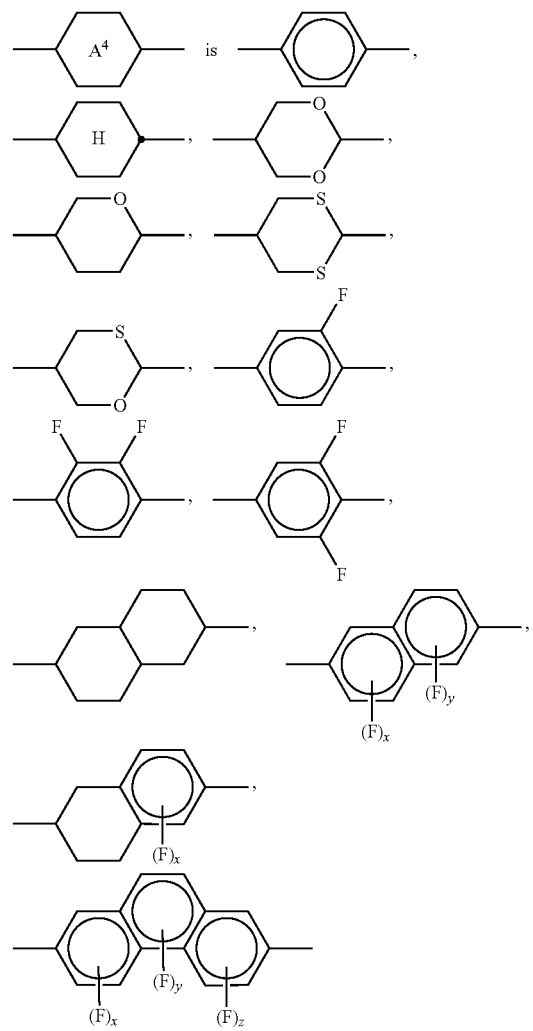

x, y and z are each, independently of one another, 0, 1 or 2,
$Z^1$, $Z^2$ and $Z^3$ are each, independently of one another, —CO—O—, —O—CO—, —$CF_2$O—, —O$CF_2$—, —$CH_2$O—, —O$CH_2$—, —$CH_2CH_2$—, —$(CH_2)_4$—, —$C_2F_4$—, —$CH_2CF_2$—, —$CF_2CH_2$—, —CF=CF—, —CH=CH—, —C≡C— or a single bond,
X is F, Cl, CN, $SF_5$, NCS, a halogenated or unsubstituted alkyl radical having up to 8 carbon atoms, in which one or more $CH_2$ groups may be replaced by —O— or —CH=CH— in such a way that O atoms are not linked directly to one another,
a is 0, 1 or 2,
b is 0, 1 or 2, and
c is 0, 1 or 2, where a+b+c is≦3.

In the pure state, the compounds of the formula I are colorless and generally form liquid-crystalline mesophases in a temperature range which is favorably located for electro-optical use. In particular, the compounds according to the invention are distinguished by their high clearing point and low rotational viscosity values. They are stable chemically, thermally and to light.

in the compounds of the formula I are preferably

X in the compounds of the formula I is preferably F, Cl, CN, NCS, $CF_3$, $SF_5$, $CF_2H$, $OCF_3$, $CH_3$, $C_2H_5$, n-$C_3H_7$, n-$C_4H_9$, n-$C_5H_{11}$, n-$C_6H_{13}$, n-$C_7H_{15}$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCFHCFHCF_3$, $OCH_2CF_2CF_3$, $OCF_2CF_2CF_3$, $CF_2CH_2CF_3$, $CF_2CHFCF_3$, $OCF_2CFHCFH_2$, $OCF_2CH_2CF_2H$, $OCFHCF_2CFH_2$, $OCFHCFHCF_2H$, $OCFHCH_2CF_3$, $OCH_2CFHCF_3$, $OCH_2CF_2CF_2H$, $OCF_2CFHCH_3$, $OCF_2CH_2CFH_2$, $OCFHCF_2CH_3$, $OCFHCF-HCFH_2$, $OCFHCH_2CF_3$, $OCH_2CF_2CFH_2$, $OCH_2CFHCF_2H$, $OCF_2CH_2CH_3$, $OCFHCFHCH_3$, $OCFHCH_2CFH_2$, $OCH_2CF_2CH_3$, $OCH_2CFHCFH_2$, $OCH_2CH_2CF_2H$, $OCHCH_2CH_3$, $OCH_2CFHCH_3$, $OCH_2CH_2CF_2H$, $OCClFCF_3$, $OCClFCClF_2$, $OCClFCFH_2$, $OCFHCCl_2F$, $OCClFCF_2H$, $OCClFCClF_2$, $OCF_2CClH_2$, $OCF_2CCl_2H$, $OCF_2CCl_2F$, $OCF_2CClFH$, $OCF_2CClF_2$, $OCF_2CF_2CClF_2$, $OCF_2CF_2CCl_2F$, $OCClFCF_2CF_3$, $OCClFCF_2CF_2H$, $OCClFCF_2CClF_2$, $OCClFCFHCF_3$, $OCClFCClFCF_3$, $OCCl_2CF_2CF_3$, $OCClHCF_2CF_3$, $OCH_2CF_2CHFCF_3$, $OCClFCF_2CF_3$, $OCClFCClFCF_3$, $OCF_2CClFCFH_2$, $OCF_2CF_2CCl_2F$, $OCF_2CCl_2CF_2H$, $OCF_2CH_2CClF_2$, $OCClFCF_2CFH_2$, $OCFHCF_2CCl_2F$, $OCClFCFHCF_2H$, $OCClFCClFCF_2H$, $OCFHCFHCClF_2$, $OCClFCH_2CF_3$, $OCFHCCl_2CF_3$, $OCCl_2CFHCF_3$, $OCH_2CClFCF_3$, $OCCl_2CF_2CF_2H$, $OCH_2CF_2CClF_2$, $OCF_2CClFCH_3$, $OCF_2CFHCCl_2H$, $OCF_2CCl_2CFH_2$, $OCF_2CH_2CCl_2F$, $OCClFCF_2CH_3$, $OCFHCF_2CCl_2H$, $OCClFCClFCFH_2$, $OCFHCFHCCl_2F$, $OCClFCH_2CF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, $OCF_2CH_2CCl_2H$, $OCClFCFHCH_3$, $OCF_2CClFCCl_2H$, $OCClFCH_2CFH_2$, $OCFHCCl_2CFH_2$, $OCCl_2CF_2CH_3$, $OCH_2CF_2CClH_2$,
$OCCl_2CFHCFH_2$, $OCH_2CClFCFCl_2$, $OCH_2CH_2CF_2H$, $OCClHCClHCF_2H$, $OCH_2CCl_2CF_2H$, $OCClFCH_2CH_3$, $OCFHCH_2CCl_2H$, $OCClHCFHCClH_2$, $OCH_2CFHCCl_2H$, $OCCl_2CH_2CF_2H$, $OCH_2CCl_2CF_2H$, $CH=CF_2$, $CF=CF_2$, $OCH=CF_2$, $OCF=CF_2$, $CH=CHF$, $OCH=CHF$, $CF=CHF$, $OCF=CHF$, in particular F, Cl, CN, NCS, $CF_3$, $C_2F_5$, n-$C_3F_7$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCF_2CF_2CF_3$, $CF_2CHFCF_3$, $CF_2CH_2CF_3$, $OCH_2CF_2CHFCF_3$, $OCF_2CHFCF_3$, $OCClFCF_2CF_3$, $CH_3$, $C_2H_5$ and n-$C_3H_7$.

For reasons of simplicity, Cyc below denotes a 1,4-cyclo-hexylene radical, Che denotes a 1,4-cyclohexenylene radical, Dio denotes a 1,3-dioxane-2,5-diyl radical, Dit denotes a 1,3-dithiane-2,5-diyl radical, Phe denotes a 1,4-phenylene radical, Pyd denotes a pyridine-2,5-diyl radical, Pyr denotes a pyrimidine-2,5-diyl radical, Bi denotes a bicyclo[2.2.2]octy-lene radical, PheF denotes a 2- or 3-fluoro-1,4-phenylene radical, PheFF denotes a 2,3-difluoro- or 2,6-difluoro-1,4-phenylene radical, Nap denotes a substituted or unsubstituted naphthalene radical, Dec denotes a decahydronaphthalene radical.

The compounds of the formula I accordingly include the preferred bicyclic compounds of the sub-formulae Ia and Ib:

| | |
|---|---|
| $CH_3$-$A^1$-$A^4$-X | Ia |
| $CH_3$-A1-$Z^1$-$A^4$-X | Ib | tricyclic compounds of the sub-formulae Ic to If:

| | |
|---|---|
| $CH_3$-$A^1$-$A^2$-$A^4$-X | Ic |
| $CH_3$-$A^1$-$Z^1$-$A^2$-$A^4$-X | Id |
| $CH_3$-$A^1$-$Z^1$-$A^2$-$Z^2$-$A^4$-X | Ie |
| $CH_3$-$A^1$-$A^2$-$Z^2$-$A^4$-X | If | tetracyclic compounds of the sub-formulae Ig to Im:

| | |
|---|---|
| $CH_3$-$A^1$-$A^2$-$A^3$-$A^4$-X | Ig |
| $CH_3$-$A^1$-$Z^1$-$A^2$-$A^3$-$A^4$-X | Ih |
| $CH_3$-$A^1$-$A^2$$A^3$-$Z^3$-$A^4$-X | Ij |
| $CH_3$-$A^1$-$Z^1$-$A^2$-$Z^2$-$A^3$-$A^4$-X | Ik |
| $CH_3$-$A^1$-$Z^1$-$A^2$-$A^3$-$Z^3$-$A^4$-X | Il |
| $CH_3$-$A^1$-$A^2$-$Z^2$-$A^3$-$Z^3$-$A^4$-X | Im |

Of these, particular preference is given to the compounds of the sub-formulae Ic, Id, and Ie.

$A^1$, $A^2$, $A^3$ and $A^4$ are preferably Phe, PheF, PheFF, Cyc or Che, furthermore Pyr or Dio, Dec or Nap. The compounds of the formula I preferably contain not more than one of the radicals Bi, Pyd, Pyr, Dio, Dit, Nap or Dec.

Preference is also given to all compounds of the formula I and of all sub-formulae in which $A^4$ is a monosubstituted or disubstituted 1,4-phenylene. These are, in particular, 2-fluoro-1,4-phenylene, 3-fluoro-1,4-phenylene, 2,3-difluoro-1,4-phenylene and 2,6-difluoro-1,4-phenylene.

Preferred smaller subgenus of compounds of the formula I are those of the sub-formulae I1 to I31:

I1
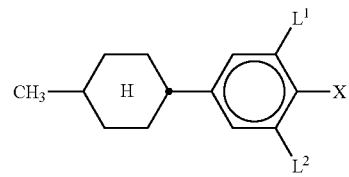
I2
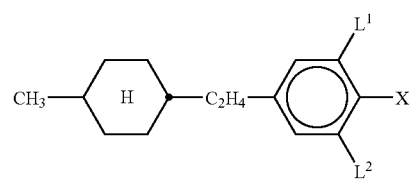
I3
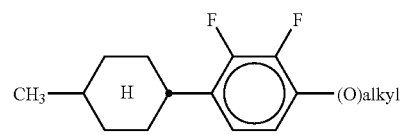
I4
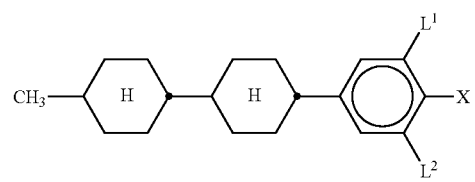
I5
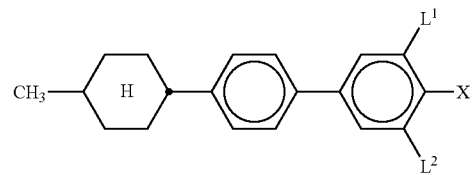
I6
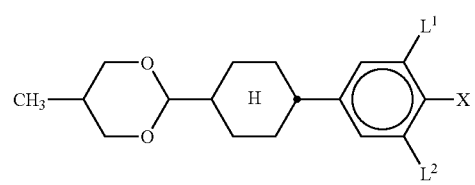
I7
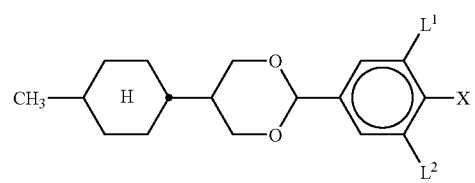
I8
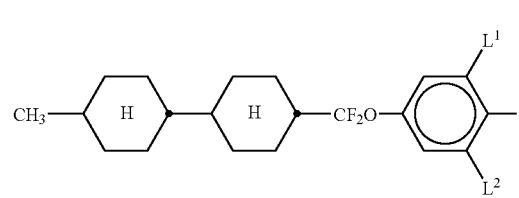
-continued
I9
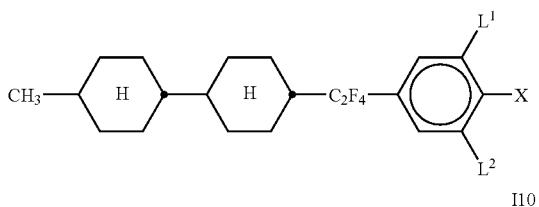
I10
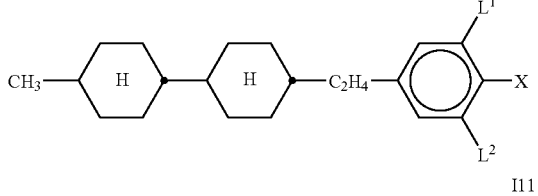
I11
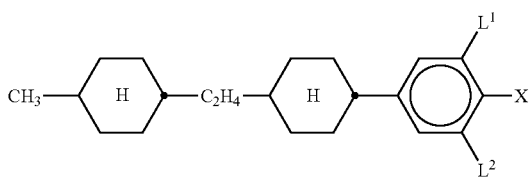
I12
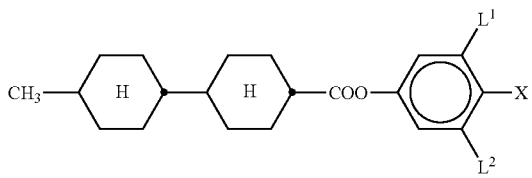
I13
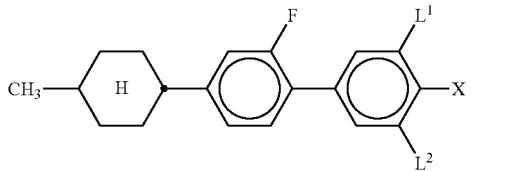
I14
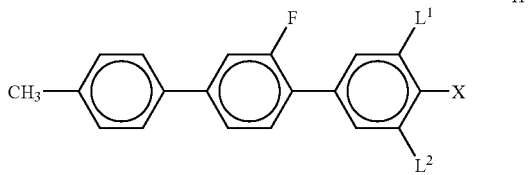
I15
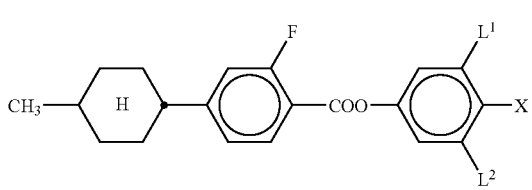
I16
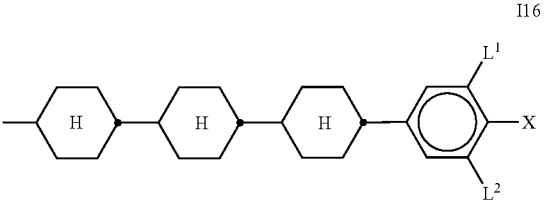

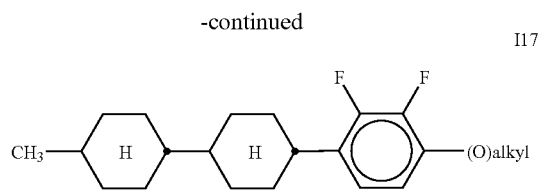
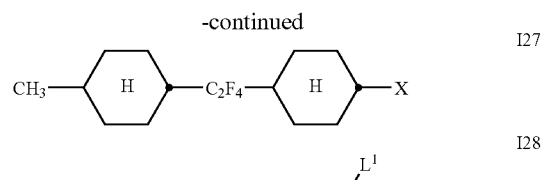
in which
X is as defined in Claim 1, and "alkyl" is a straight-chain or branched alkyl radical having 1-8 carbon atoms, and $L^1$ to $L^6$ are each, independently of one another, H or F.
Particularly preferred media comprise one or more compounds selected from the group consisting of the compounds of the formulae
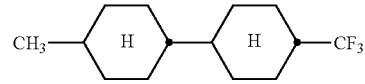
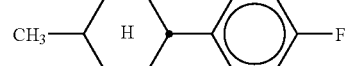
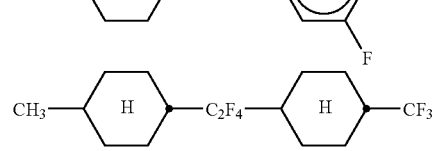

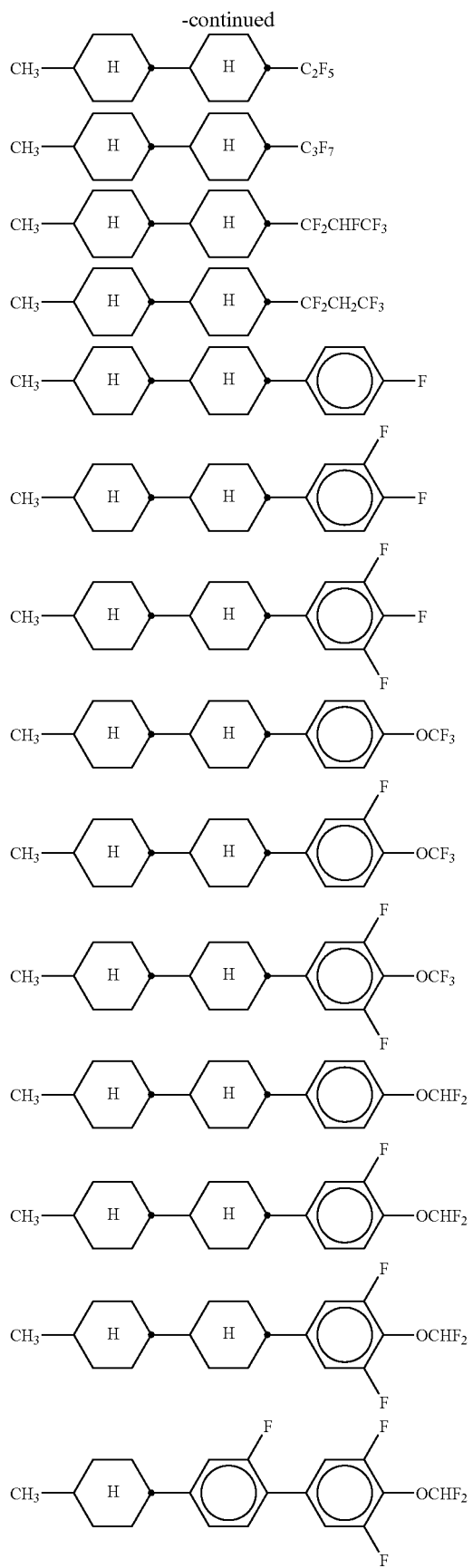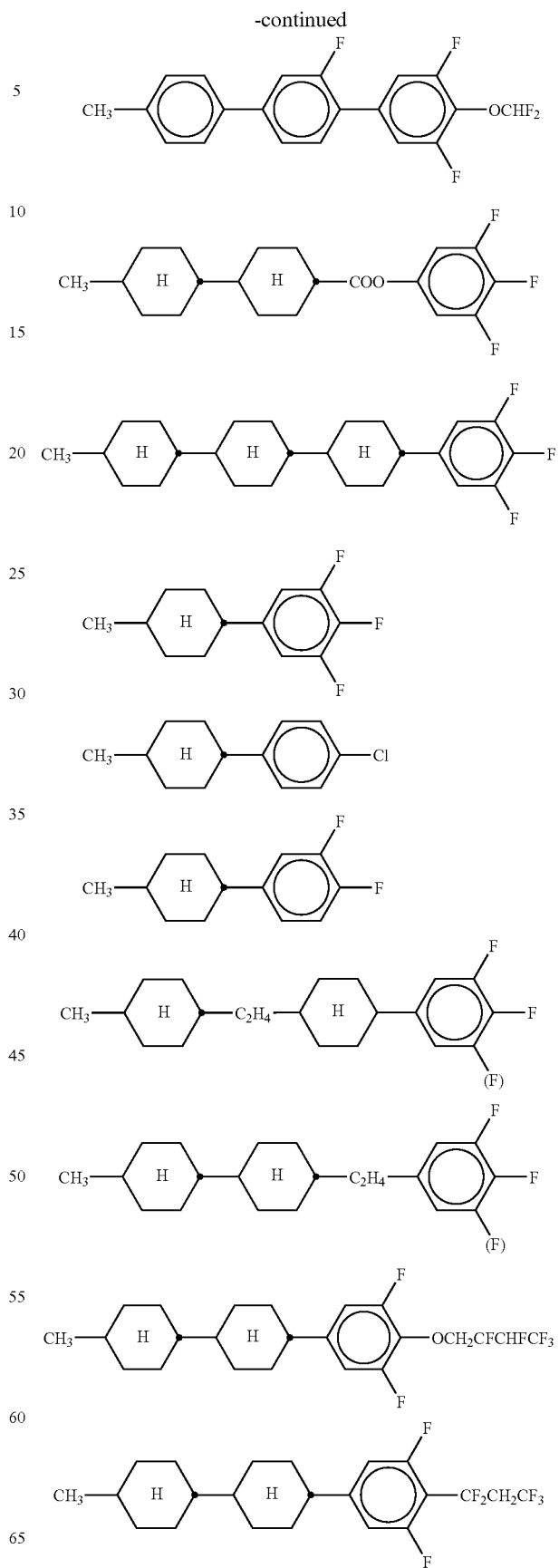

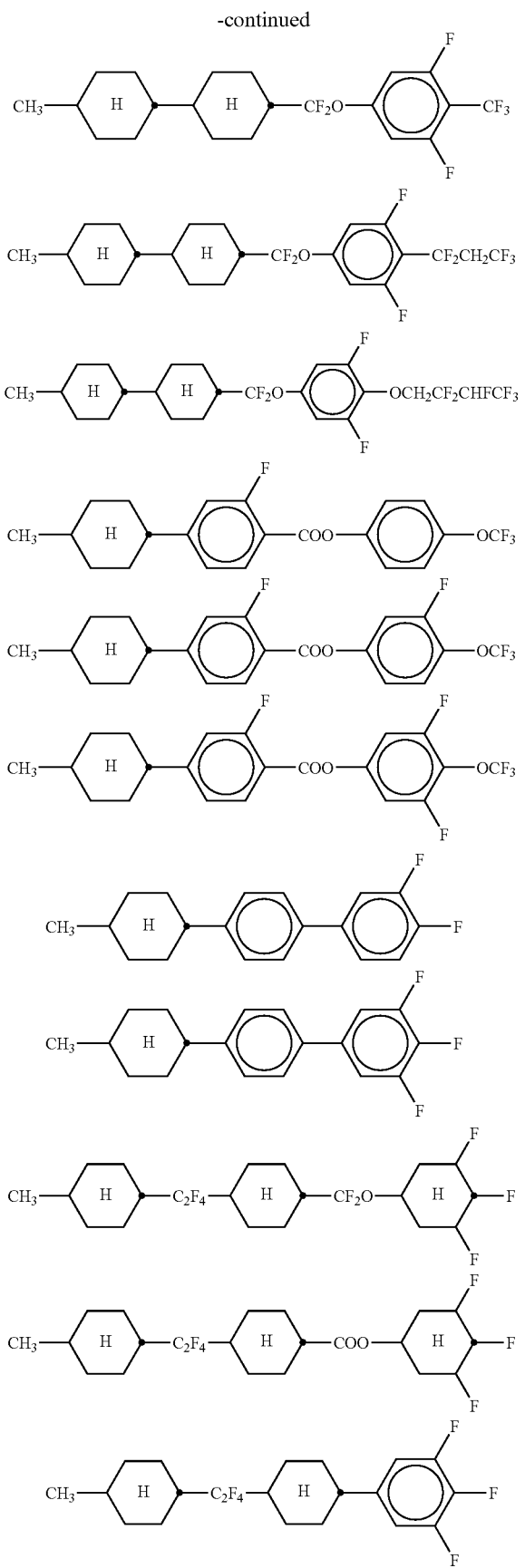
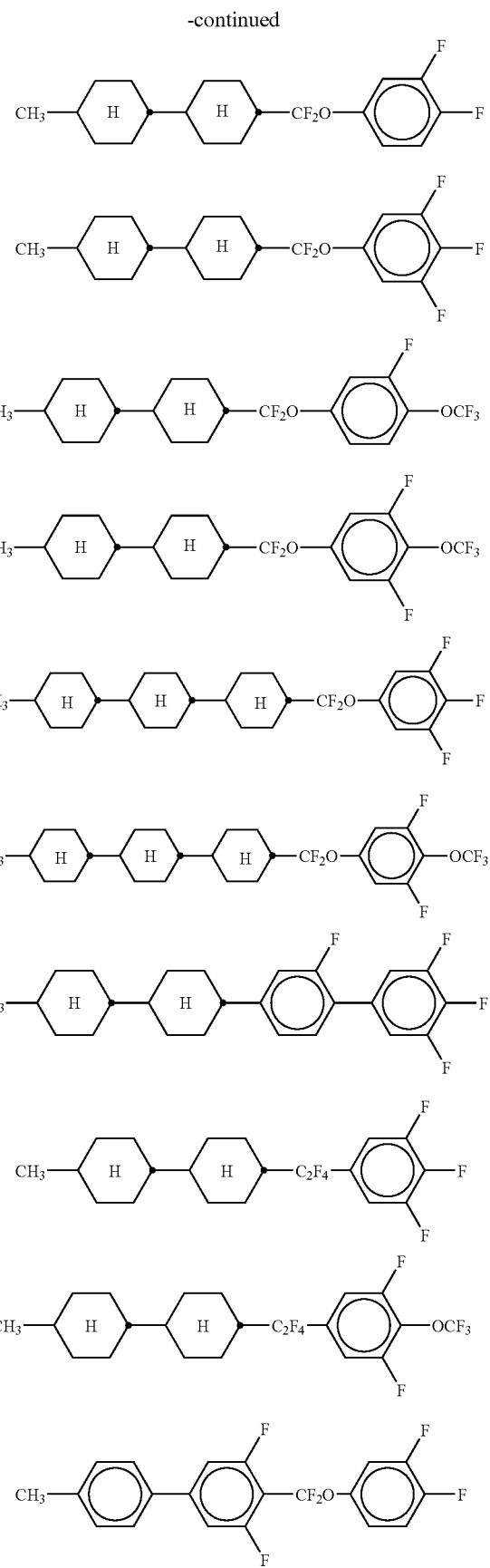

-continued

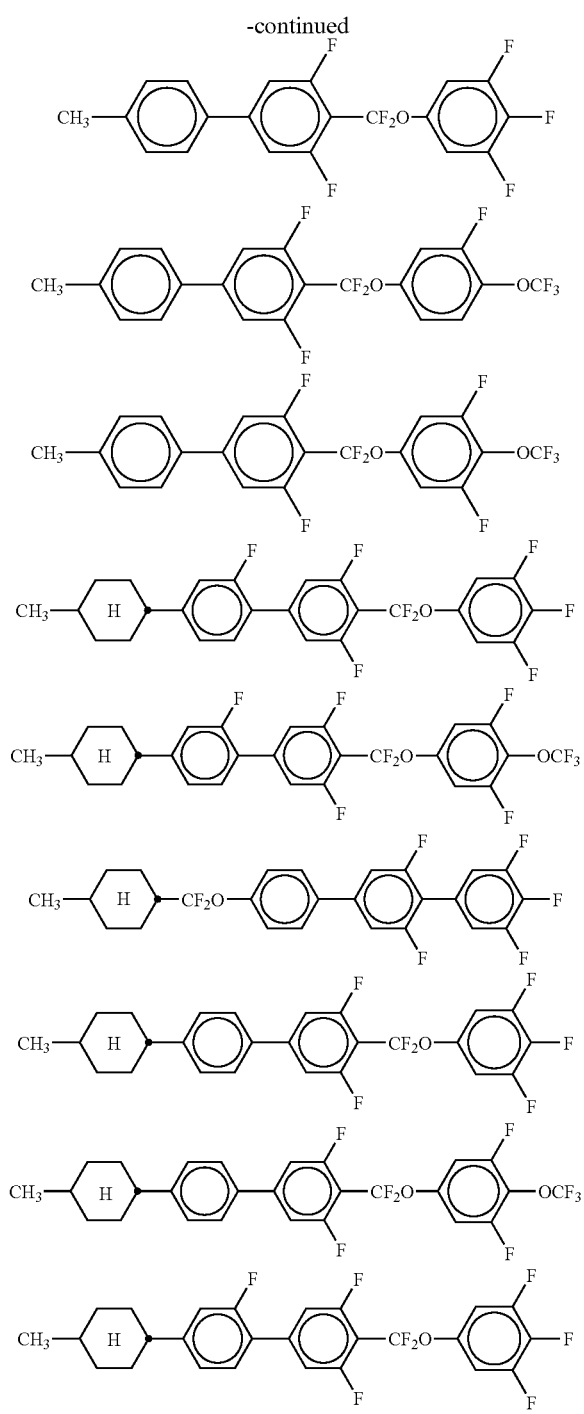

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail. Liquid-crystalline compounds having a CF$_2$O bridge or C$_2$F$_4$ bridge can be prepared, for example, as described in P. Kirsch et al., Angew. Chem. 2001, 113, 1528-1532 or 2001, 123, 5414-5417.

The compounds of the formula I can be prepared, for example, as described in European Patent Specifications 0 334 911, 0 387 032, 0 441 932 and 0 628 532. JP 2000-192040 gives the lipophilicity parameters of a few compounds containing a terminal CH$_3$ group.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention enable a significant widening of the available parameter latitude.

The achievable combinations of clearing point, optical anisotropy, viscosity at low temperature, thermal and UV stability and dielectric anisotropy are far superior to previous materials from the prior art.

The requirement for a high clearing point, a nematic phase at low temperature and a high Δ∈ has hitherto only been achieved to an inadequate extent. Although liquid-crystal mixtures such as, for example, MLC-6476 and MLC-6625 (Merck KGaA, Darmstadt, Germany) have comparable clearing points and low-temperature stabilities, they have, however, relatively low Δn values and also higher threshold voltages of about ≧1.7 V.

Other mixture systems have comparable viscosities and Δ∈ values, but only have clearing points in the region of 60° C.

The liquid-crystal mixtures according to the invention, while retaining the nematic phase down to −20° C. and preferably down to −30° C., particularly preferably down to −40° C., enable clearing points above 80° C., preferably above 90° C., particularly preferably above 100° C., simultaneously dielectric anisotropy values Δ∈ of ≧4, preferably ≧6, and a high value for the specific resistance to be achieved, enabling excellent STN and MLC displays to be obtained. In particular, the mixtures are characterised by low operating voltages. The TN thresholds are below 1.5 V, preferably below 1.3 V.

It goes without saying that, through a suitable choice of the components of the mixtures according to the invention, it is also possible for higher clearing points (for example above 110°) to be achieved at a higher threshold voltage or lower clearing points to be achieved at lower threshold voltages with retention of the other advantageous properties. At viscosities correspondingly increased only slightly, it is likewise possible to obtain mixtures having greater Δ∈ and thus lower thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975] are used, where, besides particularly favorable electro-optical properties, such as, for example, low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity $v_{20}$ at 20° C. is preferably <60 mm$^2\cdot$s$^{-1}$, particularly preferably <50 mm$^2\cdot$s$^{-1}$. The nematic phase range is preferably at least 90°, in particular at least 100°. This range preferably extends at least from −30° to +80°.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than, for example, analogous mixtures comprising cyanophenylcyclohexanes of the formula

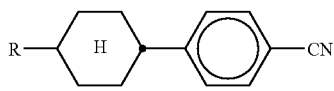

or esters of the formula

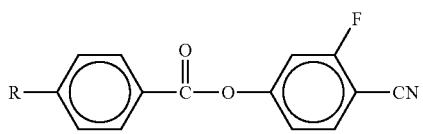

instead of the compounds of the formula I.

The UV stability of the mixtures according to the invention is also considerably better, i.e. they exhibit a significantly smaller decrease in the HR on exposure to UV.

The media according to the invention are preferably based on one or more (preferably one, furthermore two, three or more) compounds of the formula I, i.e. the proportion of these compounds is 5-95%, preferably 10-60% and particularly preferably in the range 15-40%.

The individual compounds of the formulae I to IX and their sub-formulae which can be used in the media according to the invention are either known or they can be prepared analogously to the known compounds.

Preferred embodiments are indicated below:

Medium additionally comprises one or more compounds selected from the group consisting of the general formulae II to X:

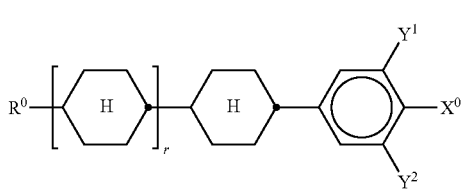

II

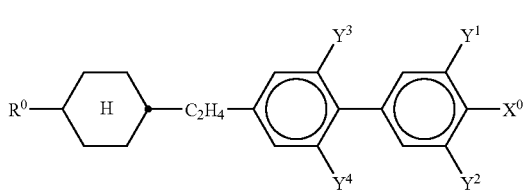

III

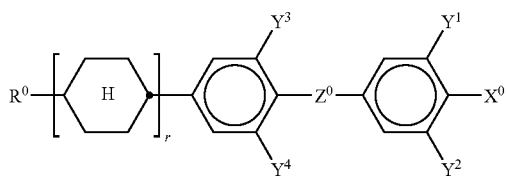

IV

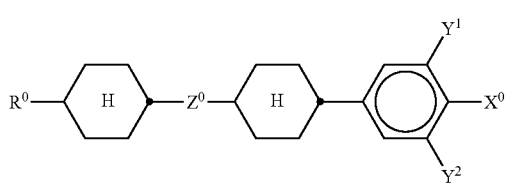

V

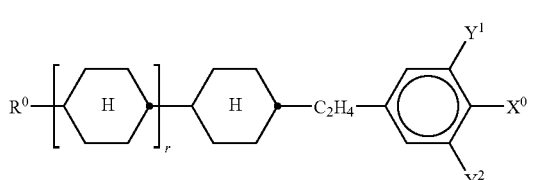

VI

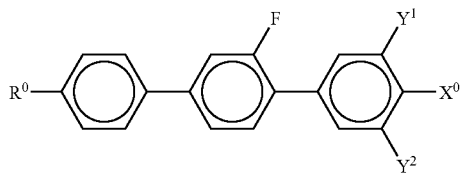

VII

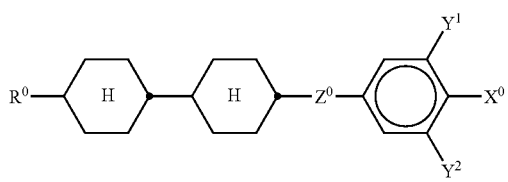

VIII

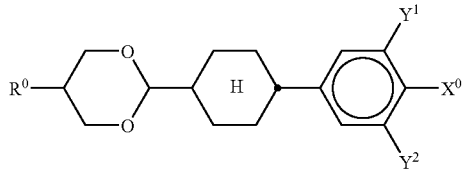

IX

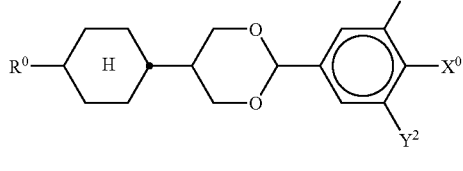

X in which the individual radicals have the following meanings:

$R^0$ is n-alkyl, oxaalkyl, fluoroalkyl, alkenyloxy or alkenyl, each having from 2 to 12 carbon atoms, $X^0$ is F, Cl, halogenated alkyl, halogenated alkenyl, halogenated alkenyloxy or halogenated alkoxy each having up to 8 carbon atoms, $Z^0$ is —CH=CH—, —C$_2$H$_4$—, —CH$_2$O—, —OCH$_2$—, —(CH$_2$)$_4$—, —C$_2$F$_4$—, —CF=CF—, —CF$_2$O—, —OCF$_2$— or —COO—, $Y^1, Y^2, Y^3$ and $Y^4$ are each, independently of one another, H or F, and r is 0 or 1.
The compound of the formula IV is preferably
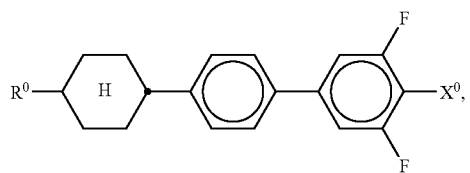
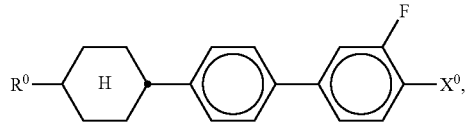
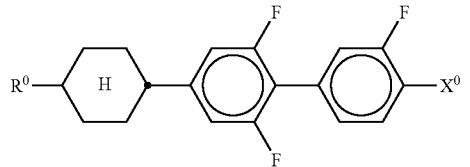
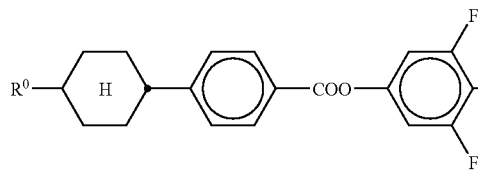
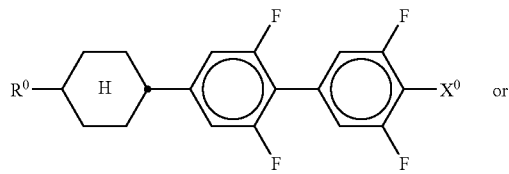 or
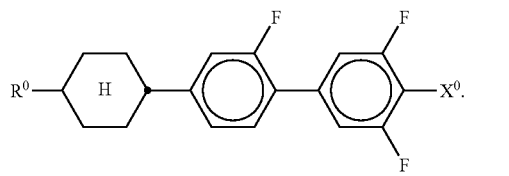
In particular, the medium additionally comprises one or more compounds of the formulae
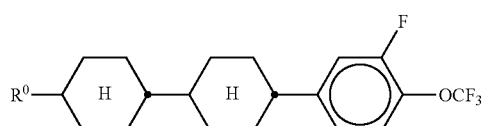
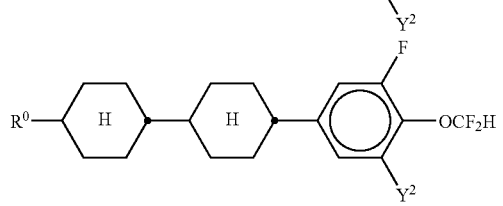
-continued
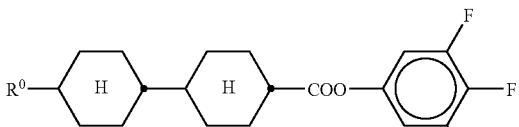
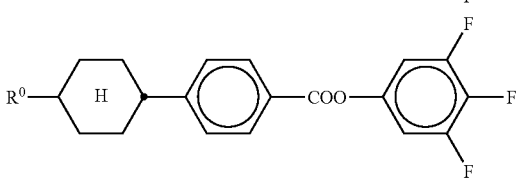
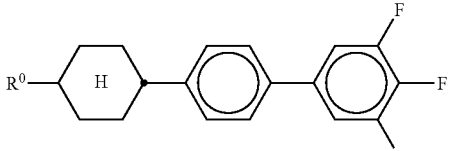
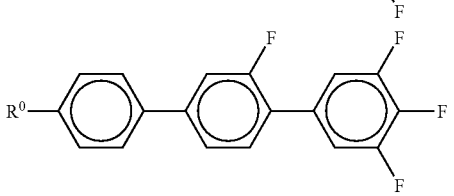
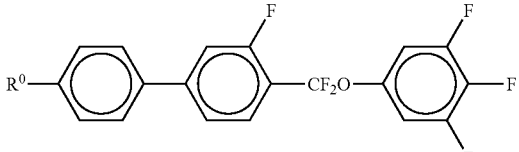
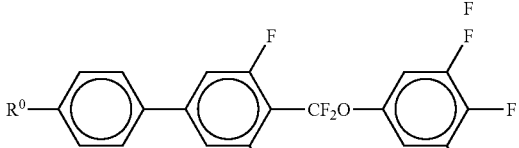
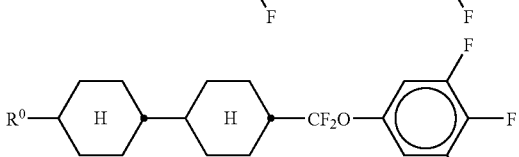
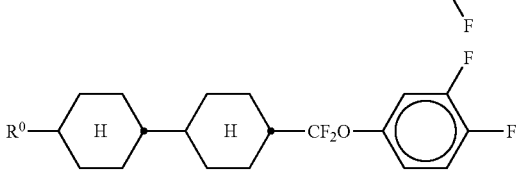
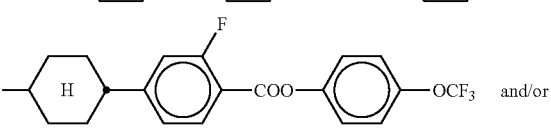 and/or
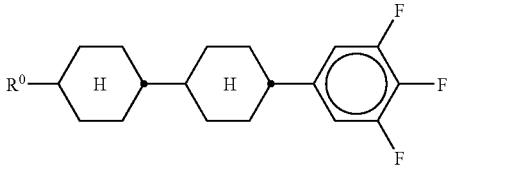
in which $R^0$ and $Y^2$ are as defined above.

The medium preferably comprises one, two or three, furthermore four homologues of the compounds selected from the group consisting of H1 to H18 (n=2-12):
H1
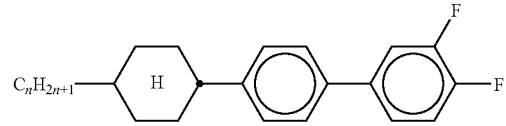
H2
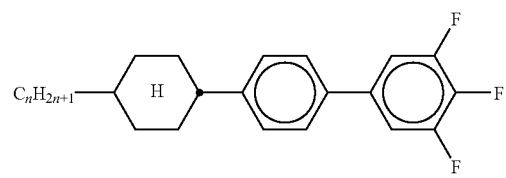
H3
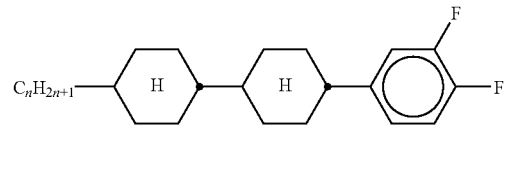
H4
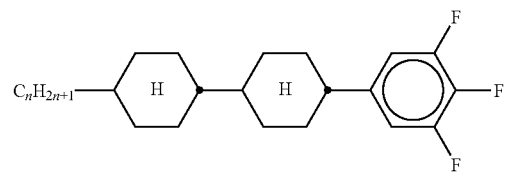
H5
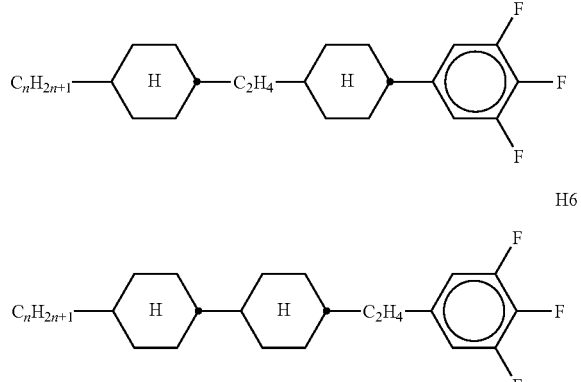
H6
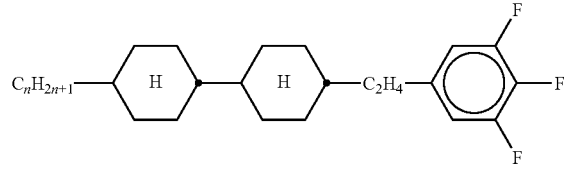
H7
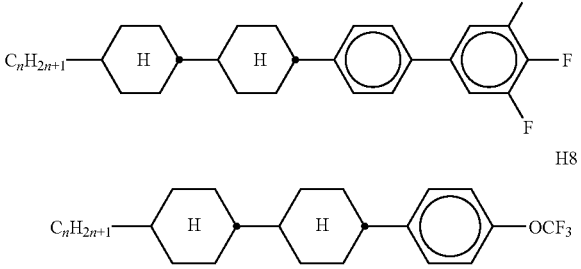
H8
-continued
H9
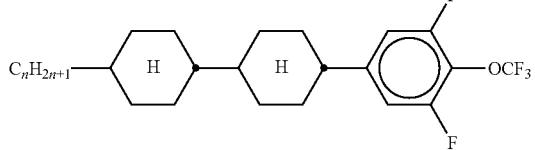
H10
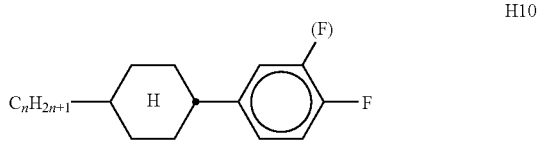
H11
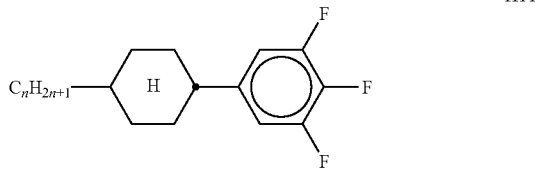
H12
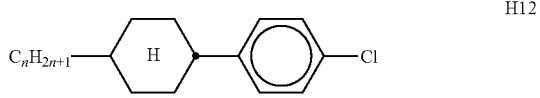
H13
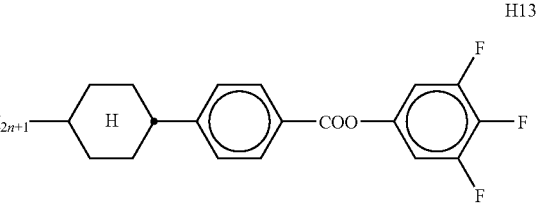
H14
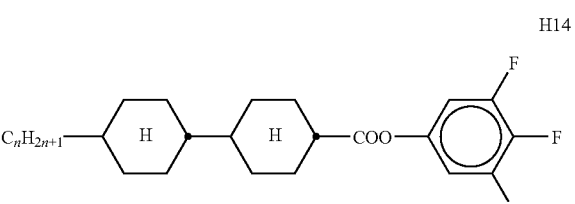
H15
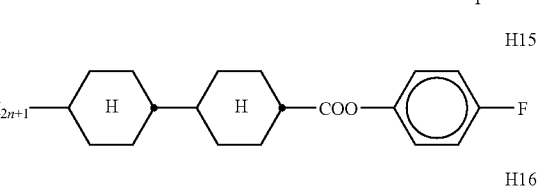
H16
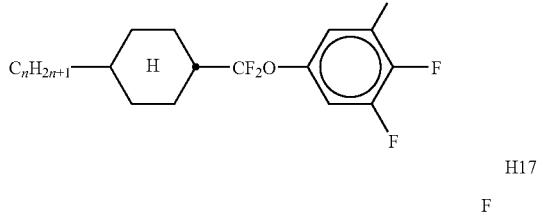
H17
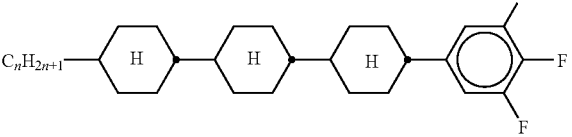

-continued

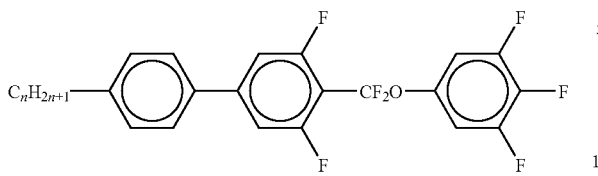
H18

The medium additionally comprises one or more dioxanes of the formula DI and/or DII,

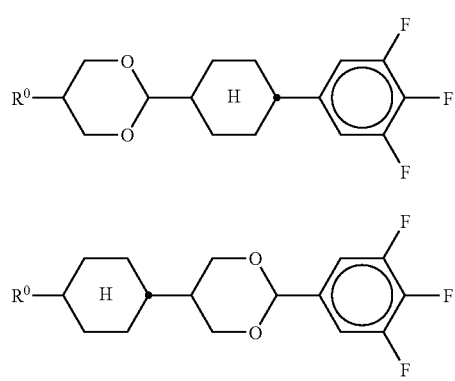

in which $R^0$ is as defined above. $R^0$ in the compounds of the formula DI and/or DII is preferably straight-chain alkyl or alkenyl having 1 to 8 carbon atoms.

The medium additionally comprises one or more compounds selected from the group consisting of the general formulae XI to XVI:

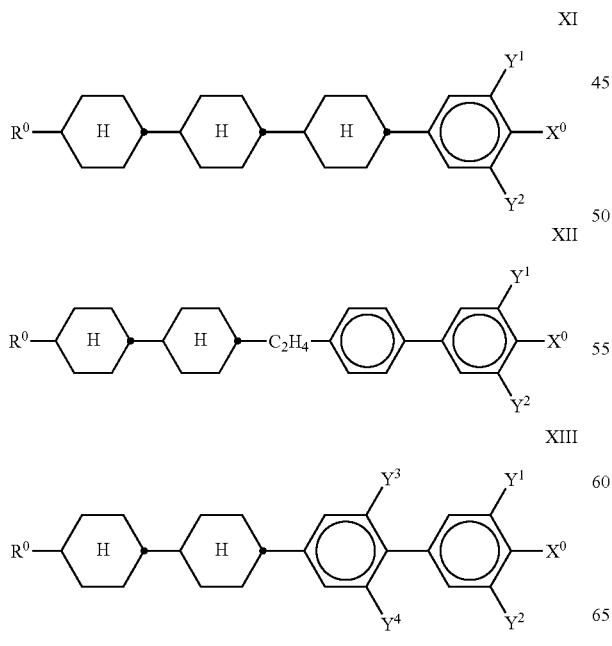

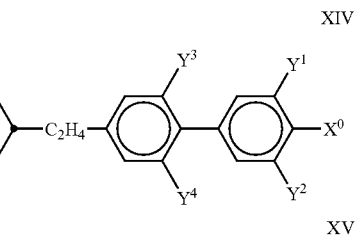

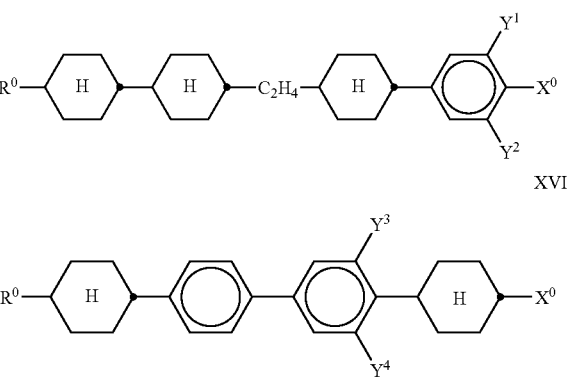

in which $R^0$, $X^0$, $Y^1$, $Y^2$, $Y^3$ and $Y^4$ are each, independently of one another, as defined above, $X^0$ preferably being F, Cl, $CF_3$, $OCF_3$ or $OCHF_2$. $R^0$ is preferably alkyl, oxaalkyl, fluoroalkyl, alkenyl or alkenyloxy.

The proportion of compounds of the formulae I to X together in the mixture as a whole is at least 50% by weight.

The proportion of compounds of the formula I in the mixture as a whole is from 5 to 50% by weight.

The proportion of compounds of the formulae II to X in the mixture as a whole is from 30 to 70% by weight.

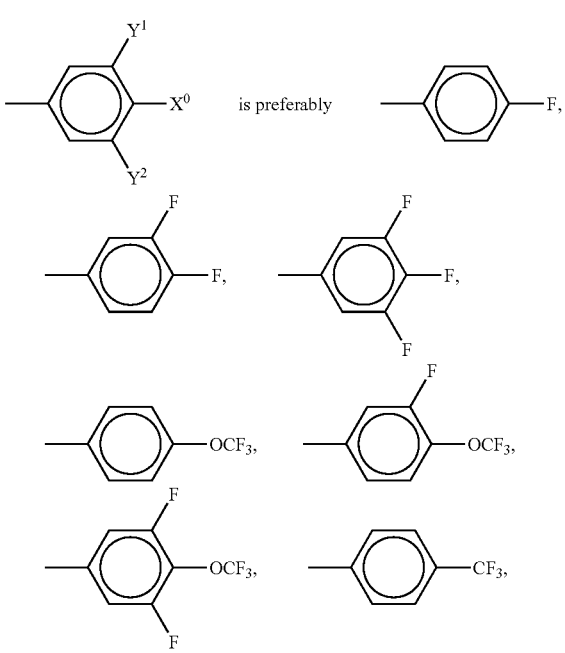

-continued

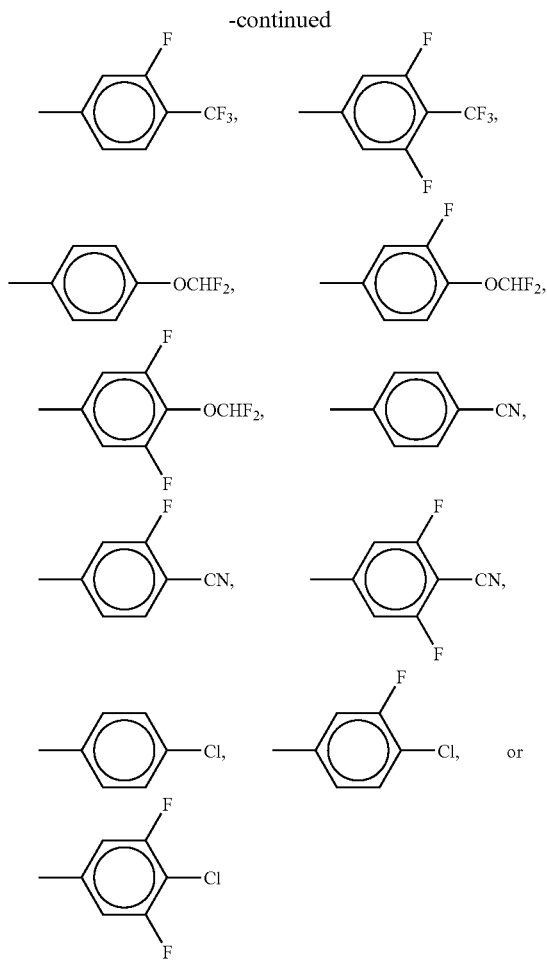

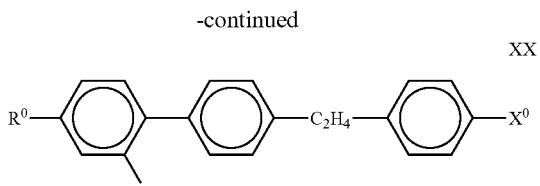

in which R⁰ and X⁰ are as defined above, and the 1,4-phenylene rings may be substituted by CN, chorine or fluorine. The 1,4-phenylene rings are preferably mono-substituted or polysubstituted by fluorine atoms.

The medium comprises further compounds, preferably selected from the following group consisting of the formulae RI to RXIV:

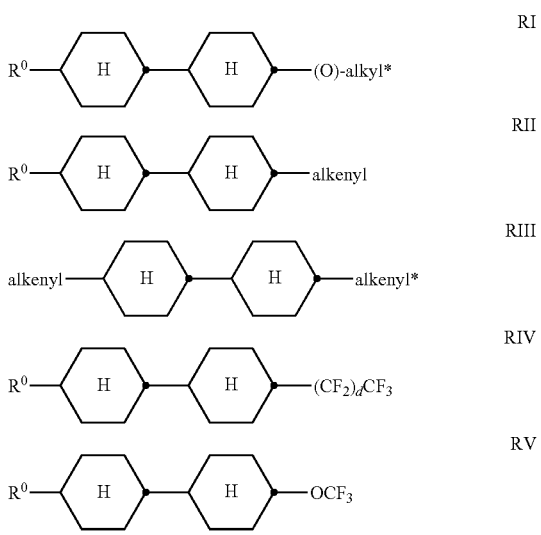

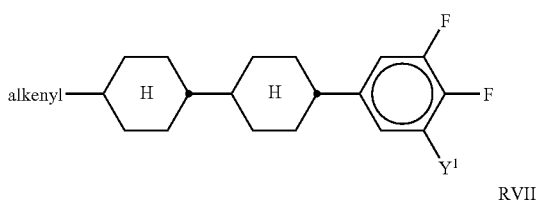

The medium comprises compounds of the formulae II, III, IV, V, VI, VII, VIII, IX and/or X.

R⁰ is straight-chain alkyl or alkenyl having from 2 to 8 carbon atoms.

The medium essentially consists of compounds of the formulae I to XVI.

The medium comprises further compounds, preferably selected from the following group consisting of the general formulae XVII to XX:

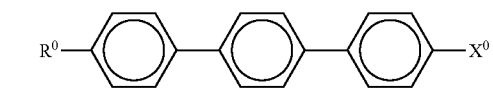

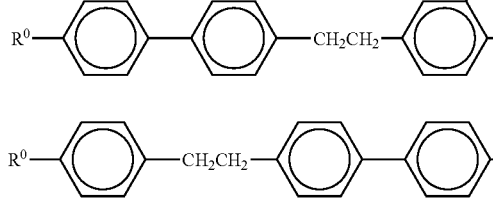

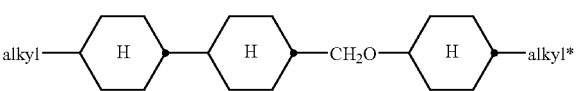

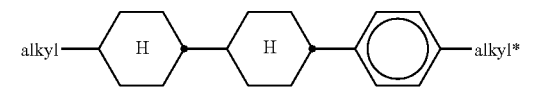

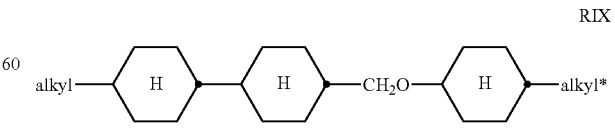

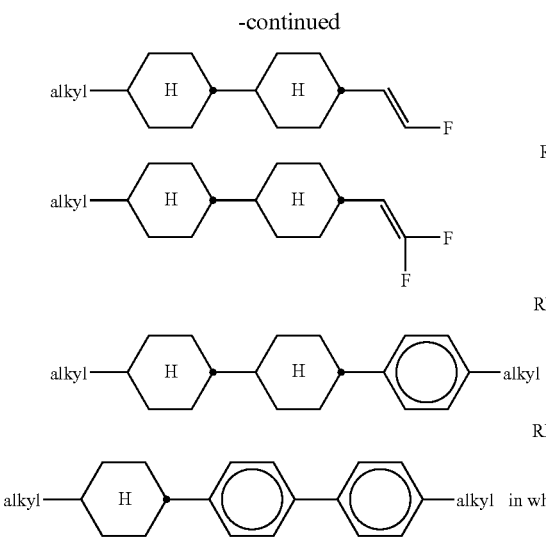

R⁰ is n-alkyl, oxaalkyl, fluoroalkyl, alkenyloxy or alkenyl, each having from 2 to 8 carbon atoms, d is 0, 1 or 2, $Y^1$ is H or F, alkyl and alkyl* are each, independently of one another, a straight-chain or branched alkyl radical having from 2 to 8 carbon atoms, alkenyl and alkenyl* are each, independently of one another, a straight-chain or branched alkenyl radical having from 2 to 8 carbon atoms.

The medium preferably comprises one or more compounds of the formulae in which n and m are each an integer from 2 to 8.

The I: (II+III+IV+V+VI+VII+VIII+IX+X) weight ratio is preferably from 1:10 to 10:1.

The medium essentially consists of compounds selected from the group consisting of the general formulae I to XVI.

It has been found that even a relatively small proportion of compounds of the formula I mixed with conventional liquid-crystal materials, but in particular with one or more compounds of the formulae II, III, IV, V, VI, VII, VIII, IX and/or X, results in a significant lowering of the threshold voltage and in low birefringence values, with broad nematic phases with low smectic-nematic transition temperatures being observed at the same time, improving the shelf life. The compounds of the formulae I to X are colorless, stable and readily miscible with one another and with other liquid-crystalline materials.

The term "alkyl" or "alkyl*" covers straight-chain and branched alkyl groups having from 2 to 8 carbon atoms, in particular the straight-chain groups ethyl, propyl, butyl, pentyl, hexyl and heptyl. Groups having 2-5 carbon atoms are generally preferred.

The term "alkenyl" or "alkenyl*" covers straight-chain and branched alkenyl groups having up to 8 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. n is preferably =1 and m is preferably from 1 to 6.

Through a suitable choice of the meanings of R⁰ and X⁰, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and larger values of $k_{33}/k_{11}$ compared with alkyl and alkoxy radicals.

A —$CH_2CH_2$— group in $Z^1$ generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I and II+III+IV+V+VI+VII+VIII+IX+X depends substantially on the desired properties, on the choice of the components of the formulae I, II, III, IV, V, VI, VII, VIII, IX and/or X, and the choice of any other components that may be present. Suitable mixing ratios within the range given above can easily be determined from case to case.

The total amount of compounds of the formulae I to XVI in the mixtures according to the invention is not crucial. The mixtures can therefore comprise one or more further components for the purposes of optimising various properties. However, the observed effect on the addressing times and the threshold voltage is generally greater, the higher the total concentration of compounds of the formulae I to XVI.

In a particularly preferred embodiment, the media according to the invention comprise compounds of the formulae II to X (preferably II and/or III) in which $X^0$ is $OCF_3$, $OCHF_2$, F, $OCH=CF_2$, $OCF=CF_2$, $OCF_2CHFCF_3$ or $OCF_2-CF_2H$. A favorable synergistic effect with the compounds of the formula I results in particularly advantageous properties.

The mixtures according to the invention having low optical anisotropy ($\Delta n<0.07$) are particularly suitable for reflective displays. Low $V_{th}$ mixtures are particularly suitable for 2.5 V and 3.3 V drivers and 4V- or 5V drivers. Ester-free mixtures are preferred for the latter applications.

The construction of the MLC display according to the invention from polarizers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0-15% of pleochroic dyes or chiral dopants can be added.

The entire disclosures of all applications, patents and publications, cited herein and of corresponding German application No. 10150198.6, filed Oct. 12, 2001 are incorporated by reference herein.

Herein, C denotes a crystalline phase, S a smectic phase, $S_C$ a smectic C phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. $\Delta n$ denotes the optical anisotropy and $n_o$ the refractive index. $\Delta \in$ denotes the dielectric anisotropy ($\Delta \in = \in_\parallel - \in_\perp$, where $\in_\parallel$ denotes the dielectric constant parallel to the longitudinal molecular axes and $\in_\perp$ denotes the dielectric constant perpendicular thereto). The electro-optical data are measured in a TN cell at the 1st minimum (i.e. at a d·$\Delta n$ value of 0.5) at 20° C., unless expressly stated otherwise. The optical data are measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are in each case, independently of one another, 1, 2, 3, 4, 5, 6, 7, 8, 9, 10, 11, 12, 13, 14 or 15. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF•F | $C_nH_{2n+1}$ | F | H | F |
| nF•F•F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_2H_{2s}$— | CN | H | H |
| nAm | $C_nH_{2n+1}$ | COOC$_m$H$_{2m+1}$ | H | H |
| nOCCF$_2$•F•F | $C_nH_{2n+1}$ | OCH$_2$CF$_2$H | F | F |

Preferred mixture components are given in Tables A and B.

TABLE A

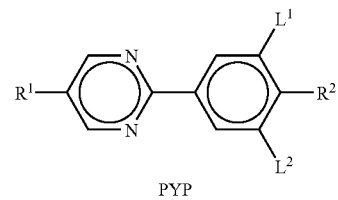

PYP

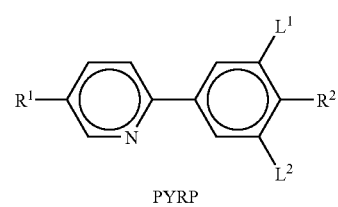

PYRP

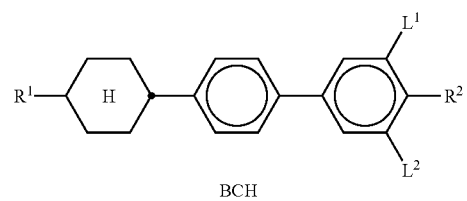

BCH

TABLE A-continued
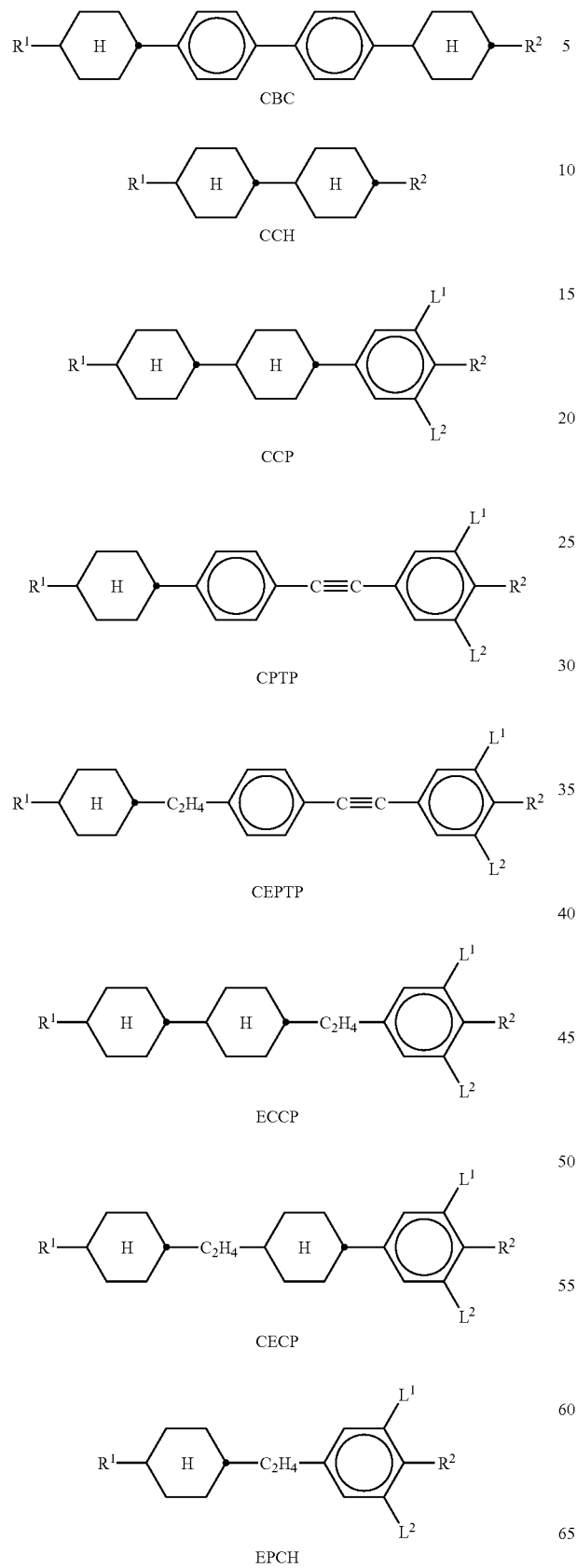
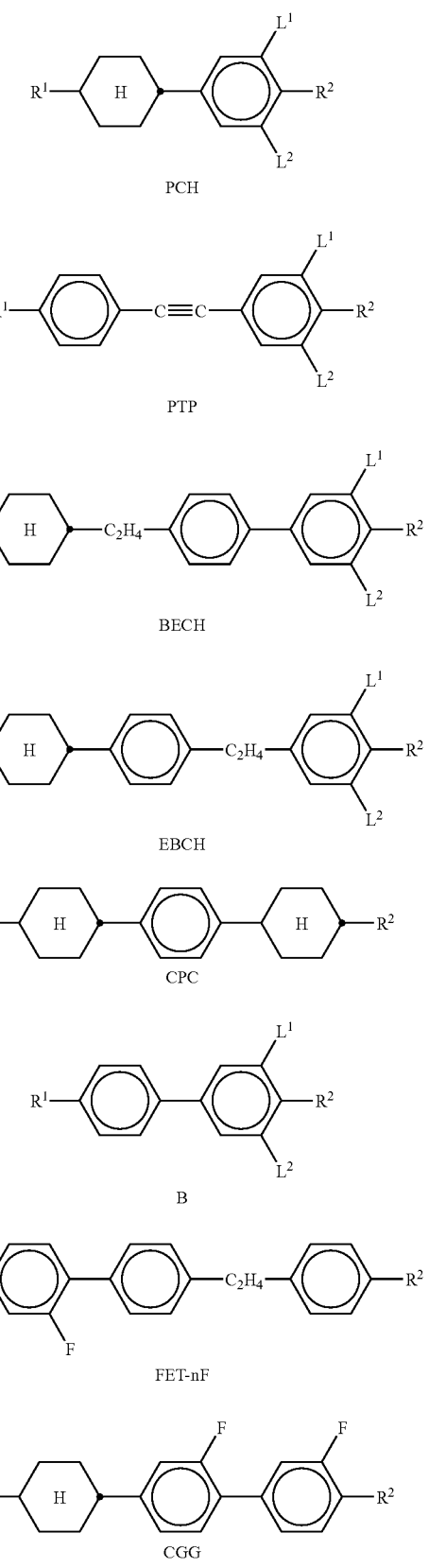

TABLE A-continued

CGU

CUP

CCQU

CWCQU

PUQU

TABLE B

CBC-nmF

PCH-nOm

FET-nCl

TABLE B-continued

CP-nOCF₃

CCH-nOm

BCH-n•FX

Inm

CBC-nmF

ECCP-nm

CCH-n1EM

T-nFm

CGU-n-F

CCP-nOCF₃•F

CGG-n-F

TABLE B-continued
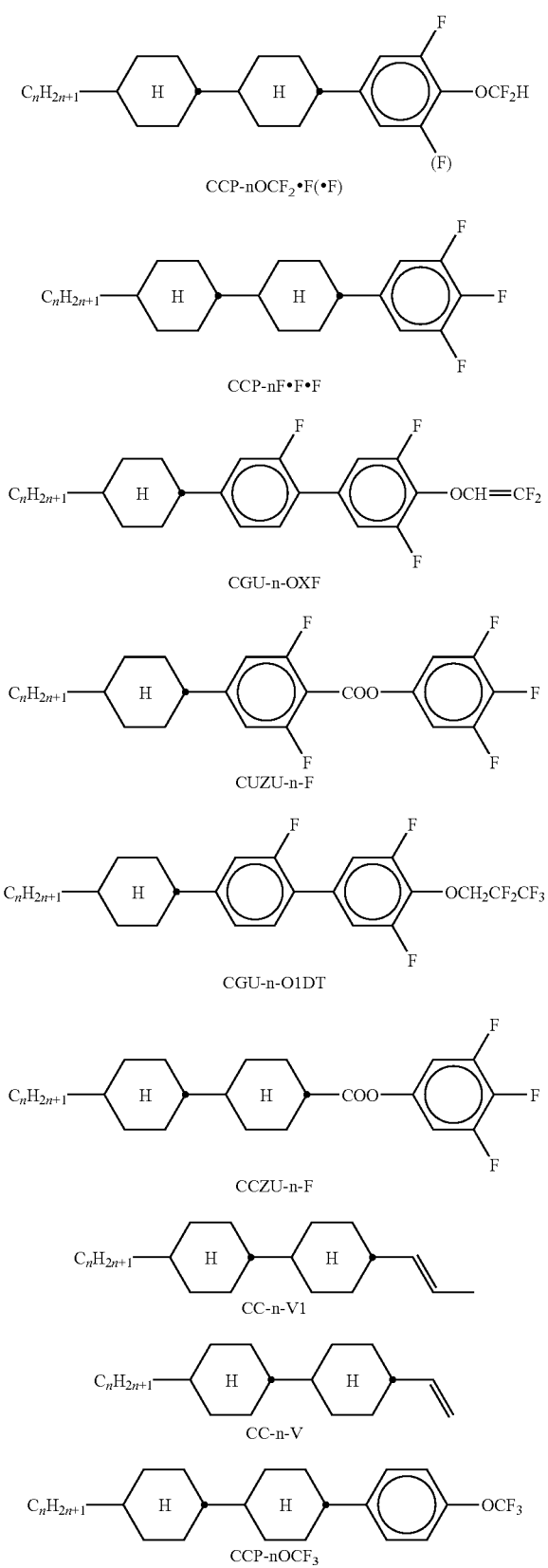
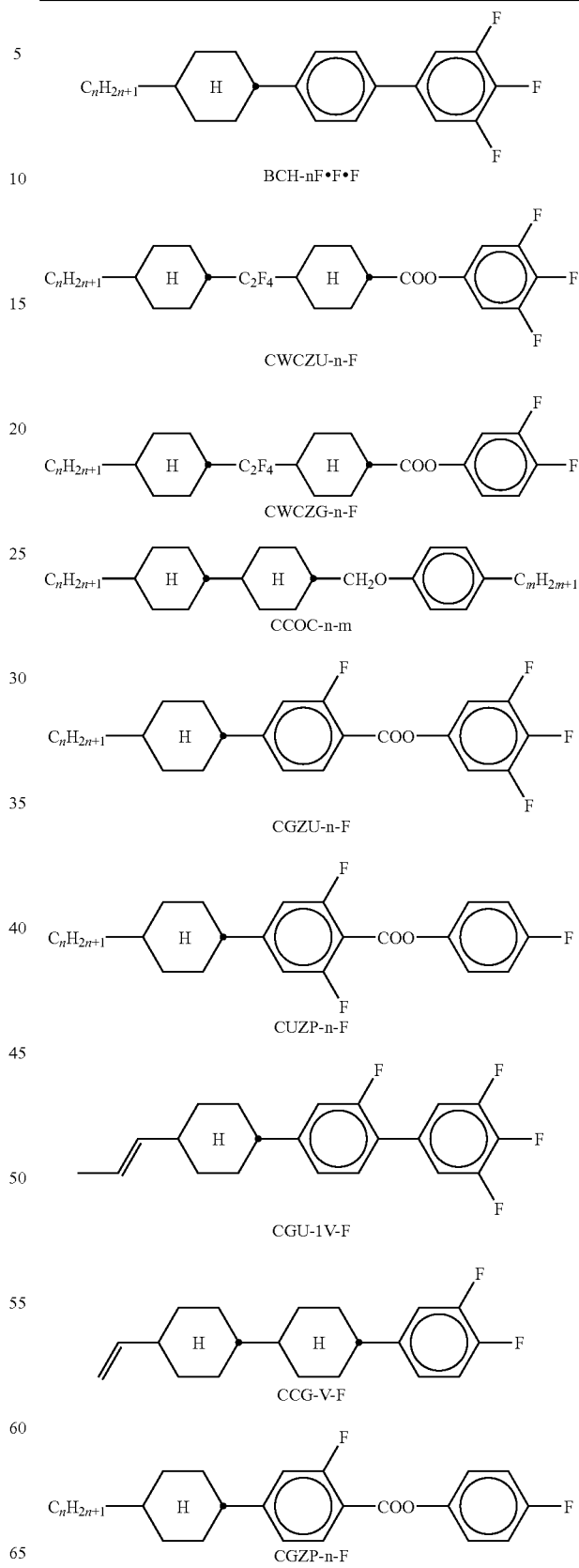

TABLE B-continued
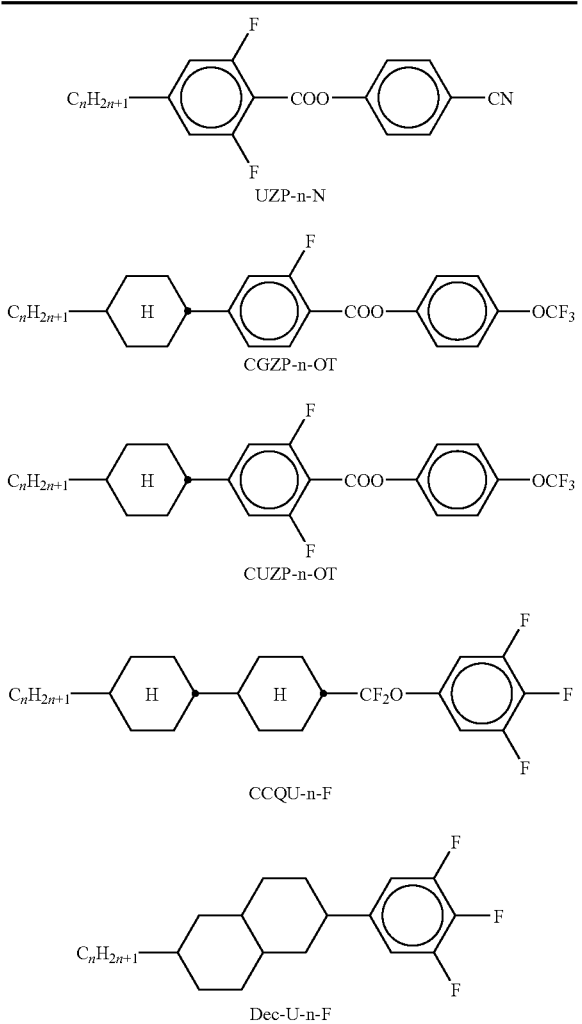
TABLE B-continued
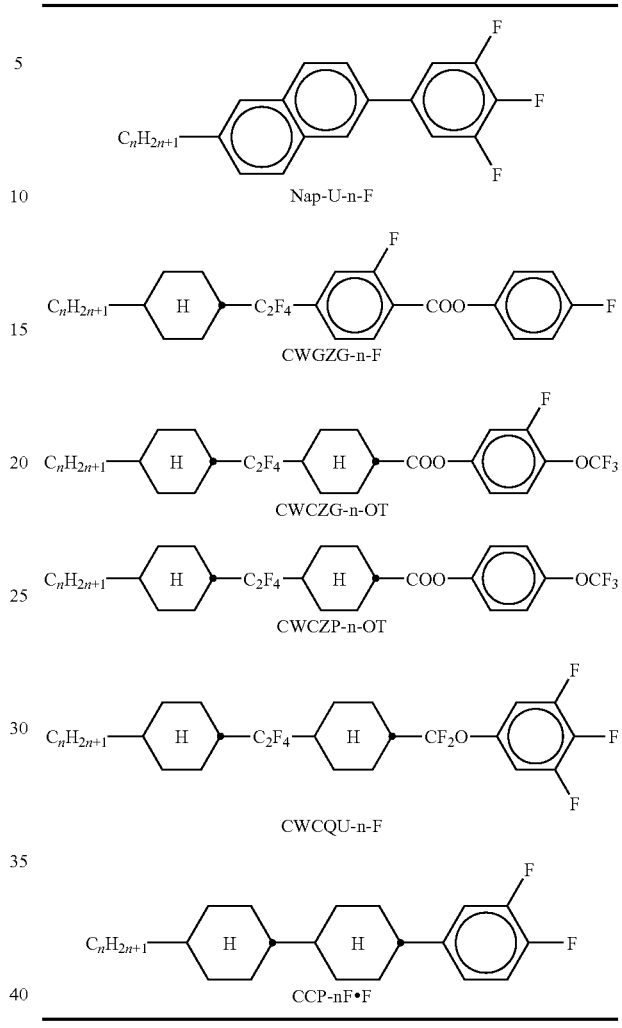
TABLE C
Table C shows possible dopants which are generally added to the mixtures according to the invention.
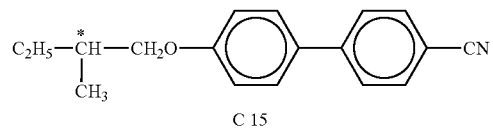
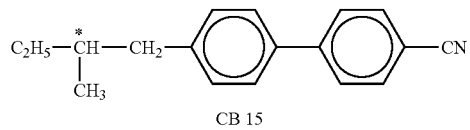

TABLE C-continued
Table C shows possible dopants which are generally added to the mixtures according to the invention.
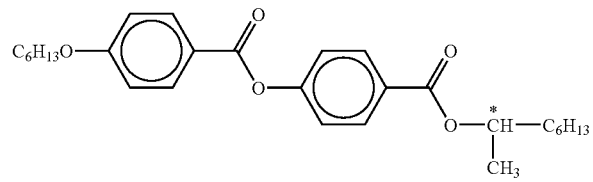
R/S-811
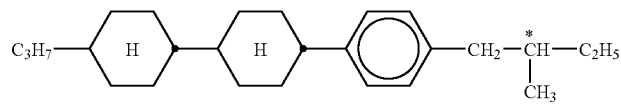
CM 44
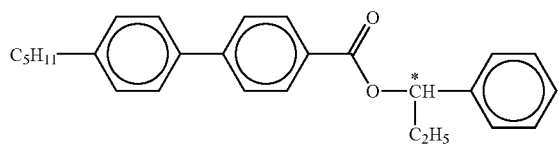
CM 45
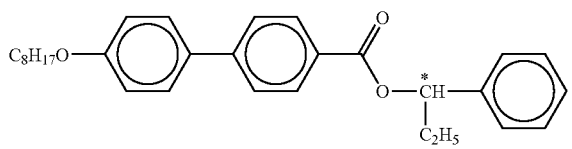
CM 47
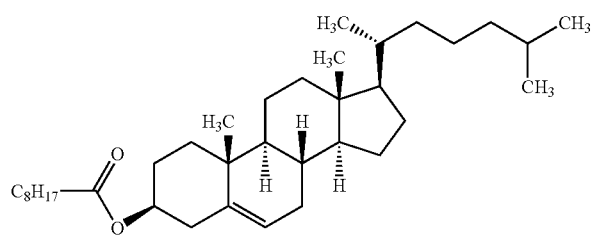
CN
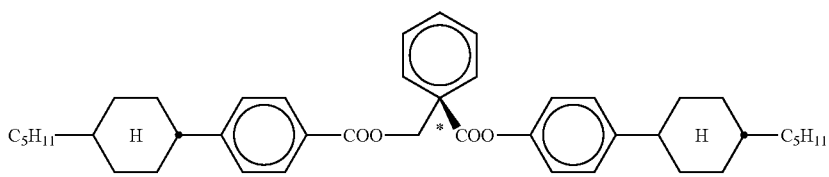
R/S-1011
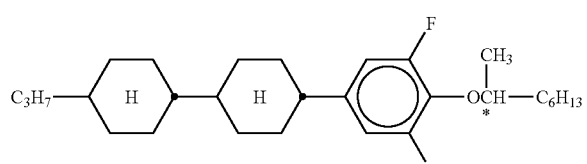
R/S-2011

TABLE C-continued
Table C shows possible dopants which are generally added to the mixtures according to the invention.
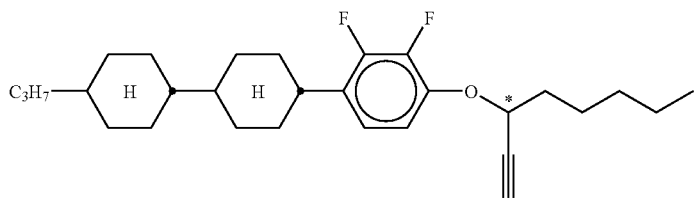
R/S-3011
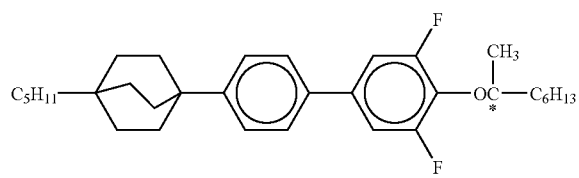
R/S-4011
TABLE D
Stabilisers which can be added, for example, to the mixtures according to the invention are indicated below.
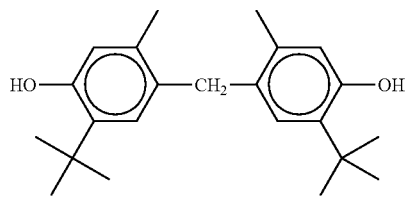
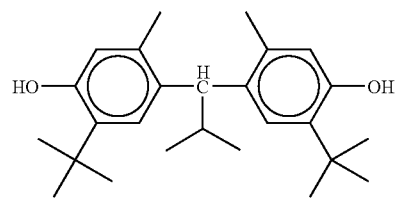
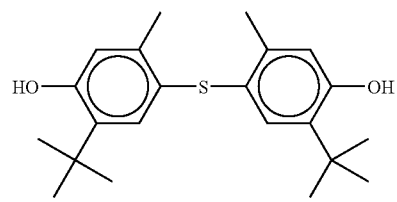
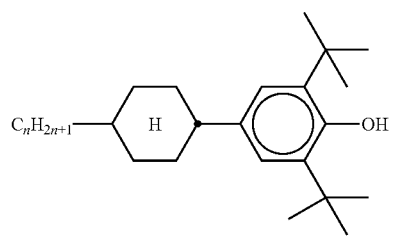

TABLE D-continued
Stabilisers which can be added, for example, to the mixtures according to the invention are indicated below.
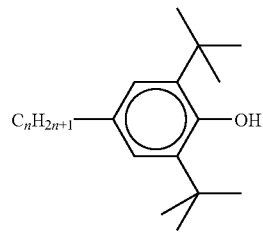
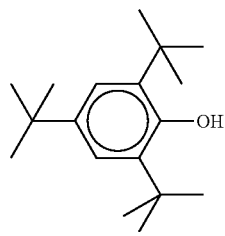
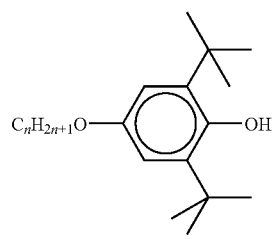
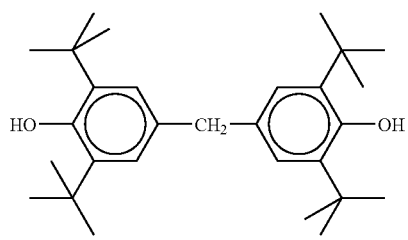
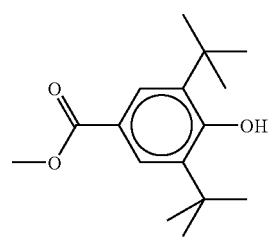

TABLE D-continued
Stabilisers which can be added, for example, to the mixtures according to the invention are indicated below.
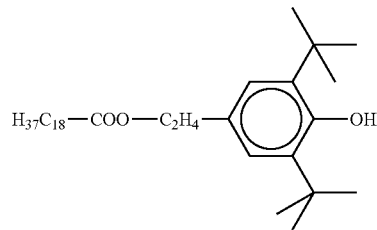
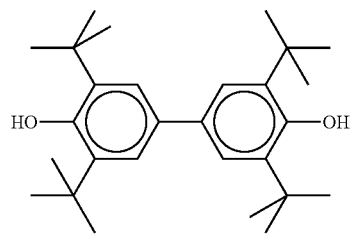
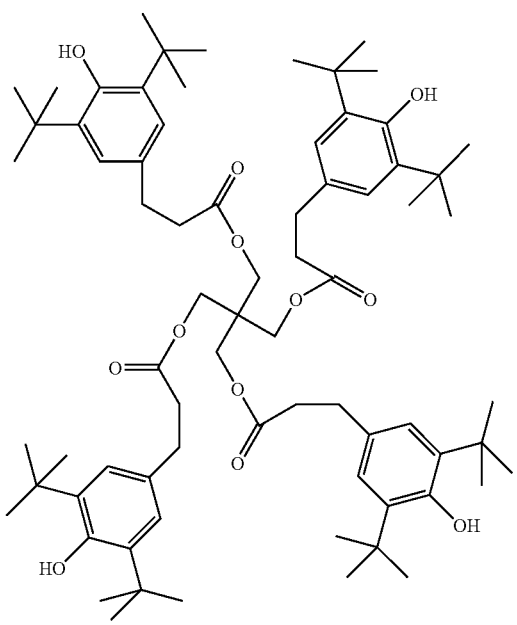
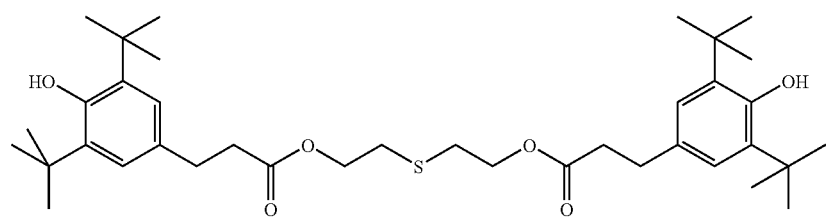

TABLE D-continued
Stabilisers which can be added, for example, to the mixtures according to the invention are indicated below.
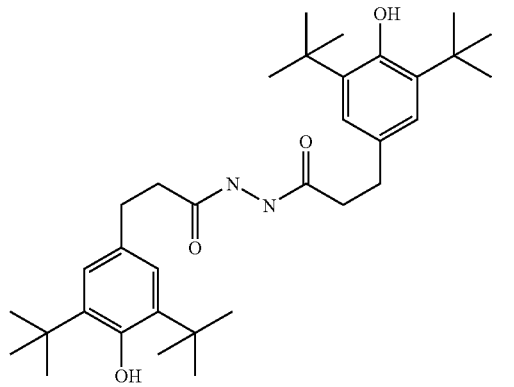
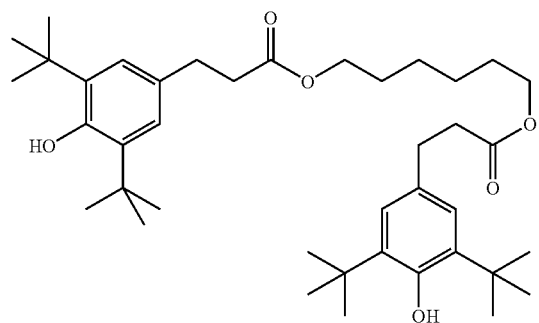
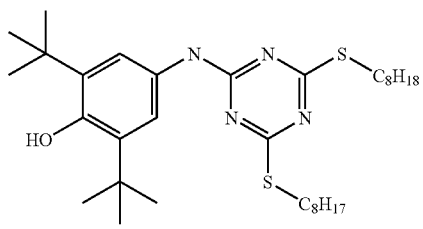
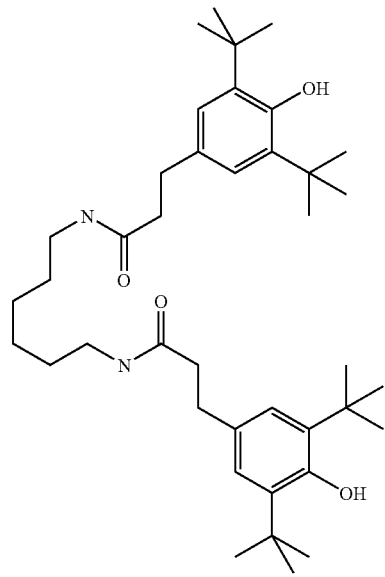

TABLE D-continued
Stabilisers which can be added, for example, to the mixtures according to the invention are indicated below.
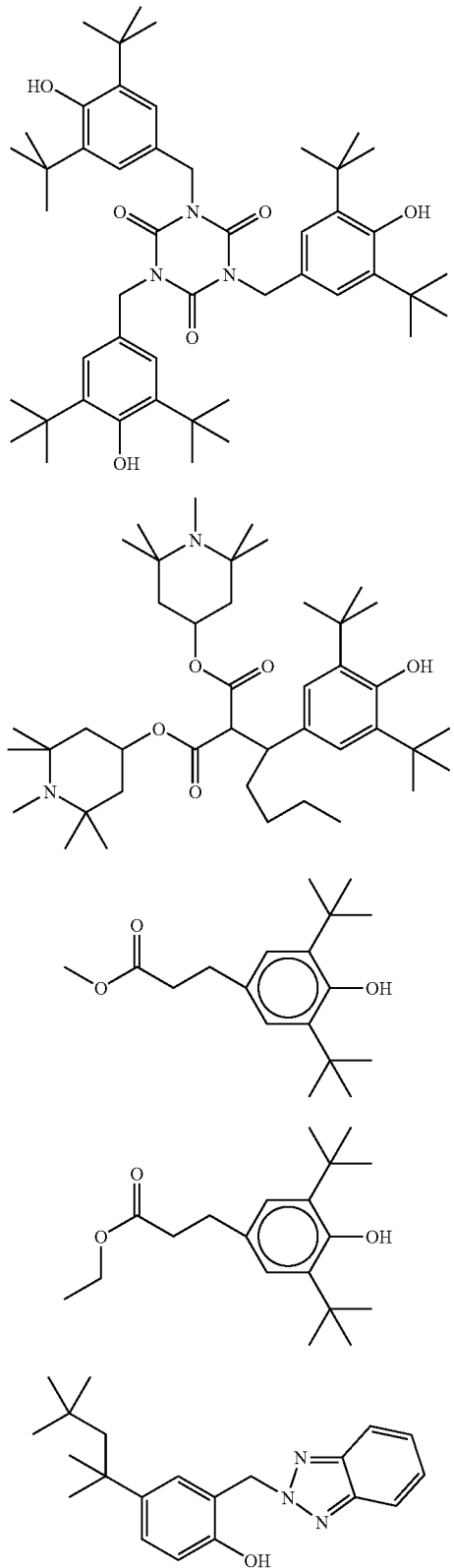

TABLE D-continued
Stabilisers which can be added, for example, to the mixtures according to the invention are indicated below.
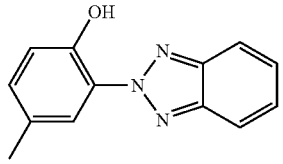
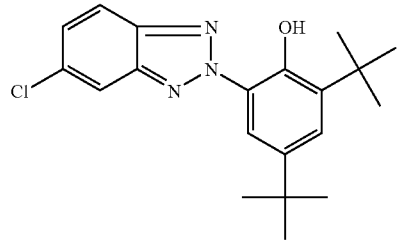
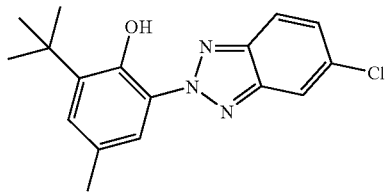
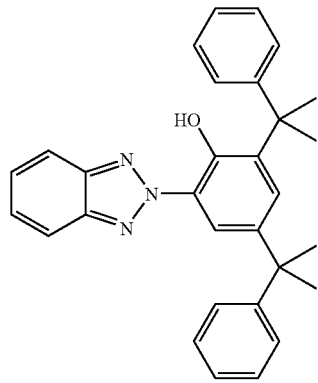
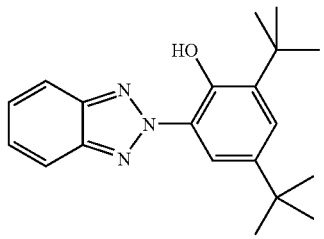
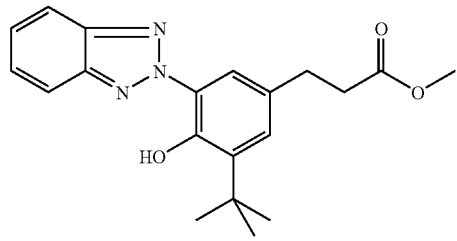

TABLE D-continued
Stabilisers which can be added, for example, to the mixtures according to the invention are indicated below.
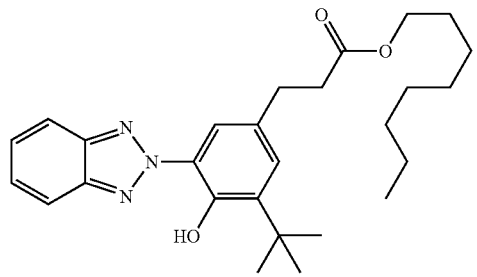
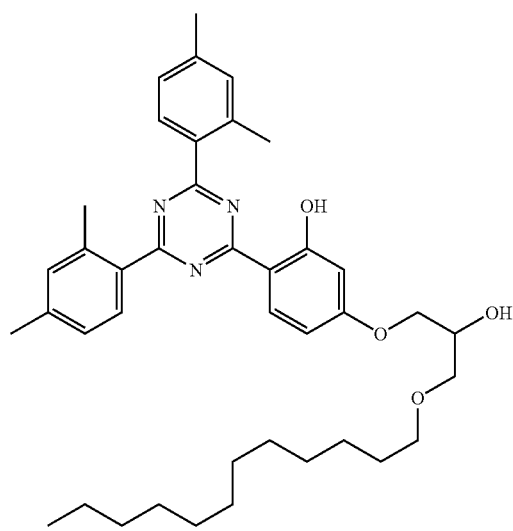
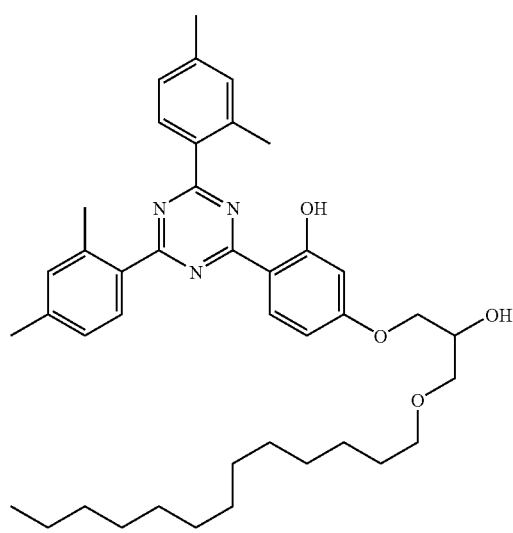

TABLE D-continued

Stabilisers which can be added, for example, to the mixtures according to the invention are indicated below.

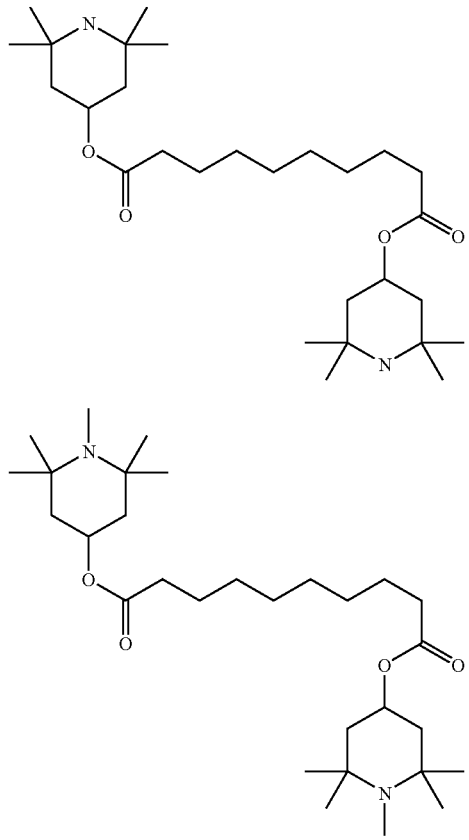

EXAMPLES

The following examples are intended to explain the invention without restricting it. Above and below, percentages are percent by weight. All temperatures are given in degrees Celsius. m.p. denotes melting point, cl.p. denotes clearing point. Furthermore, C=crystalline state, N=nematic phase, S=smectic phase and I=isotropic phase. The data between these symbols represent the transition temperatures. Δn denotes optical anisotropy (589 nm, 20° C.), the flow viscosity $\nu_{20}$ (mm²/sec) is determined at 20° C. The rotational viscosity $\gamma_1$ [mPa·s] is likewise determined at 20° C.

MIXTURE EXAMPLES

Example M1

| | | | |
|---|---|---|---|
| CCP-2F•F•F | 10.00% | S → N [° C.]: | <−40 |
| CCP-3F•F•F | 10.00% | Clearing point [° C.]: | 82.0 |
| CCP-10CF$_3$•F | 13.00% | Δn [589 nm, 20° C.]: | 0.0924 |
| CCP-20CF$_3$•F | 11.00% | $\gamma_1$ [mPa · s, 20° C.]: | 169 |
| CCP-30CF$_3$•F | 8.00% | d · Δn [μm]: | 0.5 |
| CCP-20CF$_3$ | 8.00% | Twist [°]: | 90 |
| CCP-30CF$_3$ | 7.00% | $V_{10,0,20}$ [V]: | 1.24 |
| CCP-40CF$_3$ | 4.00% | | |
| CGU-2-F | 10.00% | | |

| | |
|---|---|
| CGU-3-F | 9.50% |
| CGU-5-F | 1.00% |
| CCG-V-F | 1.50% |
| CCGU-3-F | 4.50% |
| BCH-32 | 2.50% |

Example M2

| | |
|---|---|
| CCP-2F•F•F | 9.50% |
| CCP-3F•F•F | 10.50% |
| CCP-10CF$_3$•F | 13.00% |
| CCP-20CF$_3$•F | 12.00% |
| CCP-30CF$_3$•F | 6.00% |
| CCP-20CF$_3$ | 8.00% |
| CCP-30CF$_3$ | 7.00% |
| CCP-40CF$_3$ | 4.00% |
| CGU-2-F | 10.00% |
| CGU-3-F | 10.00% |
| CCG-V-F | 3.00% |
| CCGU-3-F | 3.00% |
| BCH-32 | 4.00% |

Example M3

| | | | | |
|---|---|---|---|---|
| CCP-2F•F•F | 9.00% | S → N [° C.]: | | <−40 |
| CCP-3F•F•F | 9.00% | Clearing point [° C.]: | | 83.0 |
| CCP-10CF$_3$•F | 12.00% | Δn [589 nm, 20° C.]: | | 0.0938 |
| CCP-20CF$_3$•F | 6.00% | γ$_1$ [mPa · s, 20° C.]: | | 168 |
| CCP-30CF$_3$•F | 11.00% | d · Δn [μm]: | | 0.5 |
| CCP-20CF$_3$ | 8.00% | Twist [°]: | | 90 |
| CCP-30CF$_3$ | 7.00% | V$_{10,0,20}$ [V]: | | 1.25 |
| CCP-40CF$_3$ | 6.00% | | | |
| CGU-2-F | 10.00% | | | |
| CGU-3-F | 10.00% | | | |
| CGU-5-F | 4.50% | | | |
| CCG-V-F | 1.00% | | | |
| CCGU-3-F | 3.50% | | | |
| CCP-V-1 | 3.00% | | | |

Example M4

| | | | | |
|---|---|---|---|---|
| CC-3-V | 8.00% | Clearing point [° C.]: | | 76.0 |
| CCP-2F•F•F | 10.00% | Δn [589 nm, 20° C.]: | | 0.0879 |
| CCP-20CF$_3$•F | 7.50% | γ$_1$ [mPa · s, 20° C.]: | | 148 |
| CCP-30CF$_3$ | 3.50% | d · Δn [μm]: | | 0.5 |
| CCZU-1-F | 10.00% | Twist [°]: | | 90 |
| CCZU-2-F | 4.00% | V$_{10,0,20}$ [V]: | | 0.89 |
| CCZU-3-F | 15.00% | | | |
| CCZU-5-F | 5.00% | | | |
| CGZP-2-OT | 11.00% | | | |
| CGZP-3-OT | 9.00% | | | |
| CGU-2-F | 9.00% | | | |
| CGU-3-F | 8.00% | | | |

Example M5

| | | | | |
|---|---|---|---|---|
| CC-3-V | 18.00% | S → N [° C.]: | | <−30 |
| CCP-2F•F•F | 6.00% | Clearing point [° C.]: | | 70.0 |
| CCP-3F•F•F | 6.00% | Δn [589 nm, 20° C.]: | | 0.0762 |
| CCZU-1-F | 8.00% | Δε [kHz, 20° C.]: | | 11.5 |
| CCZU-2-F | 4.00% | K$_1$ [pN, 20° C.]: | | 8.7 |
| CCZU-3-F | 15.00% | γ$_1$ [mPa · s, 20° C.]: | | 107 |
| CGU-2-F | 3.00% | d · Δn [μm]: | | 0.50 |
| CGZP-2-OT | 11.00% | Twist [°]: | | 90 |
| CGZP-3-OT | 8.00% | | | |
| CDU-2-F | 9.00% | | | |
| CDU-3-F | 9.00% | | | |
| CDU-5-F | 3.00% | | | |

Example M6

| | | | | |
|---|---|---|---|---|
| PGU-2-F | 7.00% | Clearing point [° C.]: | | 76.0 |
| PGU-3-F | 4.00% | Δn [589 nm, 20° C.]: | | 0.0920 |
| CGZP-2-OT | 8.00% | γ$_1$ [mPa · s, 20° C.]: | | 78 |
| CGZP-3-OT | 3.00% | d · Δn [μm]: | | 0.50 |
| CCZU-1-F | 9.00% | Twist [°]: | | 90 |
| CCZU-2-F | 4.00% | V$_{10,0,20}$ [V]: | | 1.55 |
| CCP-2F•F•F | 8.00% | | | |
| CCP-20CF$_3$ | 5.00% | | | |
| CCP-30CF$_3$ | 6.00% | | | |
| CCG-V-F | 5.00% | | | |
| CC-3-V1 | 12.00% | | | |
| CC-5-V | 14.00% | | | |
| CCH-35 | 5.00% | | | |
| PCH-302 | 7.50% | | | |
| BCH-32 | 2.50% | | | |

Example M7

| | |
|---|---|
| CC-3-V | 6.00% |
| CCP-2F•F•F | 9.00% |
| CCP-3F•F•F | 7.00% |
| CCP-20CF$_3$•F | 10.00% |
| CCP-30CF$_3$ | 4.00% |
| CCZU-1-F | 8.00% |
| CCZU-2-F | 3.00% |
| CCZU-3-F | 14.00% |
| CCZU-5-F | 4.00% |
| CGZP-2-OT | 10.00% |
| CGZP-3-OT | 8.00% |
| CGU-2-F | 9.00% |
| CGU-3-F | 8.00% |

Example M8

| | | | | |
|---|---|---|---|---|
| CCP-2F•F•F | 10.00% | Clearing point [° C.]: | | 82.5 |
| CCP-3F•F•F | 10.00% | Δn [589 nm, 20° C.]: | | 0.0945 |
| CCP-20CF$_3$•F | 11.00% | γ$_1$ [mPa · s, 20° C.]: | | 177 |
| CCP-30CF$_3$•F | 11.00% | d · Δn [μm]: | | 0.50 |
| CCP-50CF$_3$•F | 5.00% | Twist [°]: | | 90 |
| CCP-30CF$_3$ | 8.00% | V$_{10,0,20}$ [V]: | | 1.29 |
| CCP-40CF$_3$ | 6.00% | | | |
| CCP-50CF$_3$ | 8.00% | | | |
| CGU-1-F | 8.00% | | | |
| CGU-2-F | 10.00% | | | |
| CGU-3-F | 9.00% | | | |
| CCGU-3-F | 4.00% | | | |

Example M9

| | | | | |
|---|---|---|---|---|
| CCP-2F•F•F | 10.00% | S → N [° C.]: | | <−30 |
| CCP-20CF$_3$ | 3.00% | Clearing point [° C.]: | | 74.5 |
| CCP-30CF$_3$ | 8.00% | Δn [589 nm, 20° C.]: | | 0.0874 |
| CCP-40CF$_3$ | 6.00% | γ$_1$ [mPa · s, 20° C.]: | | 155 |
| CCP-20CF$_3$•F | 8.50% | d · Δn [μm]: | | 0.5 |
| CCZU-2-F | 5.00% | Twist [°]: | | 90 |
| CCZU-3-F | 15.00% | V$_{10,0,20}$ [V]: | | 1.07 |
| CCZU-5-F | 5.00% | | | |
| CGZP-2-OT | 9.00% | | | |
| CGZP-3-OT | 7.00% | | | |
| CCH-3CF$_3$ | 5.00% | | | |
| CGU-1-F | 8.50% | | | |
| CGU-2-F | 10.00% | | | |

Example M10

| | | | |
|---|---|---|---|
| CC-3-V | 18.00% | S → N [° C.]: | <−30 |
| CCP-20CF₃ | 4.00% | Clearing point [° C.]: | 70.0 |
| CCP-2F•F•F | 6.00% | Δn [589 nm, 20° C.]: | 0.0770 |
| CCZU-2-F | 4.00% | Δε [kHz, 20° C.]: | 11.3 |
| CCZU-3-F | 15.00% | K₁ [pN, 20° C.]: | 8.8 |
| CCZU-5-F | 4.00% | γ₁ [mPa · s, 20° C.]: | 110 |
| CGU-1-F | 8.00% | d · Δn [µm]: | 0.5 |
| CGZP-2-OT | 9.00% | Twist [°]: | 90 |
| CGZP-3-OT | 6.00% | | |
| CDU-2-F | 9.00% | | |
| CDU-3-F | 9.00% | | |
| CDU-5-F | 7.00% | | |
| CCPC-33 | 1.00% | | |

Example M11

| | | | |
|---|---|---|---|
| CCP-1F•F•F | 12.00% | S → N [° C.]: | <−40 |
| CCP-2F•F•F | 10.00% | Clearing point [° C.]: | 81.0 |
| CCP-3F•F•F | 10.00% | Δn [589 nm, 20° C.]: | 0.0915 |
| CCP-20CF₃•F | 11.00% | γ₁ [mPa · s, 20° C.]: | 163 |
| CCP-30CF₃•F | 7.00% | d · Δn [µm]: | 0.5 |
| CCP-20CF₃ | 8.00% | Twist [°]: | 90 |
| CCP-30CF₃ | 3.00% | V₁₀,₀,₂₀ [V]: | 1.27 |
| CCP-40CF₃ | 7.00% | | |
| CGU-2-F | 10.00% | | |
| CGU-3-F | 10.00% | | |
| CCG-V-F | 4.50% | | |
| CCGU-3-F | 5.00% | | |
| CBC-33 | 2.50% | | |

Example M12

| | |
|---|---|
| CC-3-V1 | 9.00% |
| CC-5-V | 3.00% |
| CCH-35 | 5.00% |
| CCP-1F•F•F | 2.50% |
| CCP-2F•F•F | 10.00% |
| CGU-2-F | 9.00% |
| PGU-2-F | 9.00% |
| PGU-3-F | 9.00% |
| CCP-20CF₃ | 8.00% |
| CCP-30CF₃ | 8.00% |
| CCP-40CF₃ | 6.00% |
| CCP-20CF₃•F | 9.00% |
| CCP-30CF₃•F | 8.50% |
| CCGU-3-F | 4.00% |

Example M13

| | | | |
|---|---|---|---|
| CCP-1F•F•F | 11.00% | S → N [° C.]: | <−40 |
| CCP-2F•F•F | 10.00% | Clearing point [° C.]: | 81.0 |
| CCP-3F•F•F | 10.00% | Δn [589 nm, 20° C.]: | 0.0928 |
| CCP-20CF₃•F | 11.00% | Δε [kHz, 20° C.]: | 10.0 |
| CCP-30CF₃•F | 8.00% | K₁ [pN, 20° C.]: | 9.0 |
| CCP-20CF₃ | 8.00% | γ₁ [mPa · s, 20° C.]: | 164 |
| CCP-30CF₃ | 7.00% | d · Δn [µm]: | 0.05 |
| CCP-40CF₃ | 4.00% | Twist [°]: | 90 |
| CGU-2-F | 10.00% | V₁₀,₀,₂₀ [V]: | 1.29 |
| CGU-3-F | 9.50% | | |
| CGU-5-F | 1.00% | | |
| CCG-V-F | 2.50% | | |
| CCGU-3-F | 4.00% | | |
| CBC-33 | 2.00% | | |
| BCH-32 | 2.00% | | |

Example M14

| | |
|---|---|
| CCP-1F•F•F | 11.00% |
| CCP-2F•F•F | 3.00% |
| CCZU-3-F | 13.00% |
| CCP-30CF₃ | 8.00% |
| CCP-40CF₃ | 2.00% |
| CGZP-2-OT | 4.00% |
| PGU-2-F | 6.00% |
| PGU-3-F | 5.00% |
| CCG-V-F | 3.00% |
| CC-5-V | 10.00% |
| CC-3-V1 | 12.00% |
| CCH-35 | 5.00% |
| CC-3-V | 18.00% |

Example M15

| | | | |
|---|---|---|---|
| CCP-1F•F•F | 10.00% | S → N [° C.]: | <−40 |
| CCP-2F•F•F | 8.00% | Clearing point [° C.]: | 76.0 |
| CCZU-3-F | 13.00% | Δn [589 nm, 20° C.]: | 0.0782 |
| CCP-30CF₃ | 8.00% | γ₁ [mPa · s, 20° C.]: | 65 |
| CCP-40CF₃ | 3.30% | d · Δn [µm]: | 0.5 |
| CGZP-2-OT | 6.00% | Twist [°]: | 90 |
| PGU-2-F | 7.00% | V₁₀,₀,₂₀ [V]: | 1.69 |
| CC-5-V | 9.00% | | |
| CC-3-V1 | 12.00% | | |
| CCH-35 | 5.00% | | |
| CC-3-V | 18.00% | | |
| CBC-33 | 0.70% | | |

Example M16

| | |
|---|---|
| CC-3-V | 8.00 |
| CCP-30CF₃ | 1.00 |
| CCP-20CF₃•F | 14.00 |
| CCP-2F•F•F | 9.00 |
| CGU-2-F | 9.00 |
| PGU-2-F | 4.00 |
| CCZU-2-F | 4.00 |
| CCZU-3-F | 15.00 |
| CCZU-5-F | 4.00 |
| CGZP-2-OT | 11.00 |
| CGZP-3-OT | 8.00 |
| CCP-1F•F•F | 12.00 |
| CCGU-3-F | 1.00 |

Example M17

| | | | |
|---|---|---|---|
| CCP-2F•F•F | 10.00% | Clearing point [° C.]: | 75.5 |
| CCZU-2-F | 3.00% | Δn [589 nm, 20° C.]: | 0.0790 |
| CCZU-3-F | 14.00% | d · Δn [μm]: | 0.5 |
| CCP-30CF$_3$ | 6.00% | Twist [°]: | 90 |
| CGZP-1-OT | 11.00% | $V_{10,0,20}$ [V]: | 1.75 |
| PGU-2-F | 6.00% | | |
| CC-5-V | 12.00% | | |
| CC-3-V1 | 9.00% | | |
| CCH-35 | 5.00% | | |
| CC-3-V | 17.00% | | |
| CCP-V-1 | 2.00% | | |
| PCH-302 | 4.00% | | |
| CCOC-3-3 | 1.00% | | |

Example M18

| | |
|---|---|
| CCP-20CF$_3$ | 3.00% |
| CCP-30CF$_3$ | 7.00% |
| PGU-2-F | 8.00% |
| PGU-3-F | 6.00% |
| CGZP-1-OT | 15.00% |
| CGZP-2-OT | 8.00% |
| CGZP-3-OT | 7.00% |
| CCZU-2-F | 4.00% |
| CCZU-3-F | 8.00% |
| CC-5-V | 15.00% |
| CC-3-V1 | 9.00% |
| CCH-35 | 4.00% |
| PCH-53 | 6.00% |

Example M19

| | | | |
|---|---|---|---|
| PGU-2-F | 6.70% | Clearing point [° C.]: | 74.0 |
| CGZP-1-OT | 12.00% | Δn [589 nm, 20° C.]: | 0.0919 |
| CGZP-2-OT | 8.00% | d · Δn [μm]: | 0.5 |
| CGZP-3-OT | 5.00% | Twist [°]: | 90 |
| CCP-2F•F•F | 4.00% | $V_{10,0,20}$ [V]: | 1.59 |
| CCZU-2-F | 3.00% | | |
| CCZU-3-F | 12.00% | | |
| CC-3-V1 | 9.00% | | |
| CC-5-V | 15.00% | | |
| CCH-35 | 4.00% | | |
| CCP-V-1 | 5.00% | | |
| PCH-302 | 12.00% | | |
| PCH-7F | 4.30% | | |

Example M20

| | |
|---|---|
| CCP-20CF$_3$ | 3.00% |
| CCP-30CF$_3$ | 7.00% |
| PGU-2-F | 8.00% |
| PGU-3-F | 8.00% |
| CGZP-1-OT | 12.00% |
| CGZP-2-OT | 8.00% |
| CGZP-3-OT | 7.00% |
| CCZU-2-F | 4.00% |
| CCZU-3-F | 9.00% |
| CC-5-V | 15.00% |
| CC-3-V1 | 9.00% |
| CCH-35 | 5.00% |
| PCH-53 | 5.00% |

Example M21

| | | | |
|---|---|---|---|
| CC-3-V | 20.00% | S → N [° C.]: | <−30 |
| CCP-2F•F•F | 6.00% | Clearing point [° C.]: | 69.0 |
| CCP-3F•F•F | 5.00% | Δn [589 nm, 20° C.]: | 0.0775 |
| CCZU-2-F | 4.00% | Δε [kHz, 20° C.]: | 11.0 |
| CCZU-3-F | 14.00% | $K_1$ [pN, 20° C.]: | 8.6 |
| CCZU-5-F | 4.00% | d · Δn [μm]: | 0.5 |
| CGU-2-F | 5.00% | Twist [°]: | 90 |
| CGZP-1-OT | 7.00% | | |
| CGZP-2-OT | 7.00% | | |
| CGZP-3-OT | 6.00% | | |
| CDU-2-F | 9.00% | | |
| CDU-3-F | 9.00% | | |
| CDU-5-F | 4.00% | | |

Example M22

| | | | |
|---|---|---|---|
| CC-3-V | 20.00% | S → N [° C.]: | <−30 |
| CCP-2F•F•F | 9.00% | Clearing point [° C.]: | 71.0 |
| CCZU-2-F | 3.00% | Δn [589 nm, 20° C.]: | 0.0772 |
| CCZU-3-F | 11.00% | Δε [kHz, 20° C.]: | 10.9 |
| CGZP-1-OT | 10.00% | $K_1$ [pN, 20° C.]: | 9.8 |
| CGZP-2-OT | 10.00% | $γ_1$ [mPa·s, 20° C.]: | 100 |
| CGZP-3-OT | 5.00% | d · Δn [μm]: | 0.5 |
| CDU-2-F | 9.00% | Twist [°]: | 90 |
| CDU-3-F | 9.00% | $V_{10,0,20}$ [V]: | 1.0 |
| CDU-5-F | 9.00% | | |
| CCH-35 | 4.00% | | |

Example M23

| | |
|---|---|
| CCP-1F•F•F | 15.00% |
| CCP-2F•F•F | 15.00% |
| CCP-3F•F•F | 14.00% |
| CCP-4F•F•F | 17.00% |
| CCP-5F•F•F | 16.00% |
| CCP-6F•F•F | 17.00% |
| CCOC-3-3 | 3.00% |
| CCOC-4-3 | 3.00% |

Example M24

| | | | |
|---|---|---|---|
| CCP-1F•F•F | 12.00% | S → N [° C.]: | <−40 |
| CCP-2F•F•F | 10.00% | Clearing point [° C.]: | 81.0 |
| CCP-3F•F•F | 10.00% | Δn [589 nm, 20° C.]: | 0.0915 |
| CCP-20CF$_3$•F | 11.00% | $γ_1$ [mPa · s, 20° C.]: | 163 |
| CCP-30CF$_3$•F | 7.00% | d · Δn [μm]: | 0.5 |
| CCP-20CF$_3$ | 8.00% | Twist [°]: | 90 |
| CCP-30CF$_3$ | 3.00% | $V_{10,0,20}$ [V]: | 1.27 |
| CCP-40CF$_3$ | 7.00% | | |

-continued

| | |
|---|---|
| CGU-2-F | 10.00% |
| CGU-3-F | 10.00% |
| CCG-V-F | 4.50% |
| CCGU-3-F | 5.00% |
| CBC-33 | 2.50% |

Example M25

| | |
|---|---|
| CCP-1F•F•F | 12.00% |
| CCP-2F•F•F | 10.00% |
| CCP-3F•F•F | 11.00% |
| CCP-20CF$_3$•F | 11.00% |
| CCP-30CF$_3$•F | 3.00% |
| CCP-20CF$_3$ | 8.00% |
| CCP-30CF$_3$ | 7.00% |
| CCP-40CF$_3$ | 7.00% |
| CGU-2-F | 10.00% |
| CGU-3-F | 10.00% |
| CCG-V-F | 1.00% |
| BCH-2F•F | 2.00% |
| CCGU-3-F | 5.00% |
| CBC-33 | 3.00% |

Example M26

| | | | |
|---|---|---|---|
| CCP-1F•F•F | 14.00% | Clearing point [° C.]: | 81.5 |
| CCP-2F•F•F | 13.00% | Δn [589 nm, 20° C.]: | 0.0703 |
| CCP-3F•F•F | 12.00% | d · Δn [μm]: | 0.5 |
| CCP-4F•F•F | 13.00% | Twist [°]: | 90 |
| CCP-5F•F•F | 11.00% | V$_{10,0,20}$ [V]: | 1.41 |
| CCP-6F•F•F | 14.00% | | |
| CCP-7F•F•F | 12.00% | | |
| CCOC-3-3 | 3.00% | | |
| CCOC-4-3 | 3.00% | | |
| CCOC-3-5 | 2.00% | | |
| CCH-3CF$_3$ | 3.00% | | |

Example M27

| | | | |
|---|---|---|---|
| CCP-1F•F•F | 16.00% | Clearing point [° C.]: | 81.5 |
| CCP-2F•F•F | 15.00% | Δn [589 nm, 20° C.]: | 0.0714 |
| CCP-3F•F•F | 14.00% | d · Δn [μm]: | 0.5 |
| CCP-4F•F•F | 19.00% | Twist [°]: | 90 |
| CCP-5F•F•F | 15.00% | V$_{10,0,20}$ [V]: | 1.37 |
| CCP-7F•F•F | 15.00% | | |
| CCOC-3-3 | 3.00% | | |
| CCOC-4-3 | 3.0% | | |

Example M28

| | |
|---|---|
| CC-5-V | 10.00% |
| CC-3-V1 | 12.00% |
| CCH-35 | 4.00% |
| CC-3-V | 18.00% |
| CCP-1F•F•F | 12.00% |
| CCP-2F•F•F | 10.00% |
| CCZU-3-F | 6.00% |
| CCP-30CF$_3$ | 7.00% |
| CGZP-2-OT | 11.00% |
| CGZP-3-OT | 4.00% |
| PGU-2-F | 3.00% |
| CBC-33 | 3.00% |

Example M29

| | | | |
|---|---|---|---|
| CCP-1F•F•F | 12.00% | S → N [° C.]: | <−40 |
| CCP-2F•F•F | 11.00% | Clearing point [° C.]: | 85.5 |
| CCP-3F•F•F | 11.00% | Δn [589 nm, 20° C.]: | 0.0924 |
| CCP-20CF$_3$•F | 11.00% | d · Δn [μm]: | 0.5 |
| CCP-20CF$_3$ | 8.00% | Twist [°]: | 90 |
| CCP-30CF$_3$ | 8.00% | V$_{10,0,20}$ [V]: | 1.45 |
| CCP-40CF$_3$ | 2.00% | | |
| CCG-V-F | 15.00% | | |
| CGU-2-F | 3.00% | | |
| BCH-3F•F•F | 11.00% | | |
| BCH-32 | 5.00% | | |
| CCP-V-1 | 2.00% | | |
| CBC-33 | 1.00% | | |

Example M30

| | | | |
|---|---|---|---|
| CC-5-V | 15.00% | S → N [° C.]: | <−40 |
| CCH-35 | 5.00% | Clearing point [° C.]: | 69.5 |
| CCH-3CF$_3$ | 3.00% | Δn [589 nm, 20° C.]: | 0.0768 |
| CCP-1F•F•F | 12.00% | Δε [kHz, 20° C.]: | 9.2 |
| CCP-2F•F•F | 10.00% | K$_1$ [pN, 20° C.]: | 8.9 |
| CCP-3F•F•F | 10.00% | γ$_1$ [mPa · s, 20° C.]: | 102 |
| CGU-2-F | 9.00% | d · Δn [μm]: | 0.5 |
| CGZP-2-OT | 11.00% | Twist [°]: | 90 |
| CGZP-3-OT | 2.00% | V$_{10,0,20}$ [V]: | 1.04 |
| CCZU-2-F | 4.00% | | |
| CCZU-3-F | 15.00% | | |
| CCP-20CF$_3$ | 2.00% | | |
| CBC-33 | 2.00% | | |

Example M31

| | | | |
|---|---|---|---|
| CC-3-V1 | 9.00% | S → N [° C.]: | <−40 |
| CC-5-V | 12.00% | Clearing point [° C.]: | 79.0 |
| CCH-35 | 4.00% | Δn [589 nm, 20° C.]: | 0.0929 |
| PGU-2-F | 9.00% | γ$_1$ [mPa · s, 20° C.]: | 93 |
| CGZP-2-OT | 9.00% | d · Δn [μm]: | 0.5 |
| BCH-3F•F•F | 7.00% | Twist [°]: | 90 |
| CCP-1F•F•F | 11.00% | V$_{10,0,20}$ [V]: | 1.43 |
| CCP-2F•F•F | 10.00% | | |
| CCP-40CF$_3$ | 7.00% | | |
| CCP-30CF$_3$ | 8.00% | | |
| CCZU-2-F | 4.00% | | |
| CCZU-3-F | 7.00% | | |
| BCH-32 | 3.00% | | |

Example M32

| | | | |
|---|---|---|---|
| CC-3-V1 | 9.00% | S → N [° C.]: | <−40 |
| CGU-2-F | 10.00% | Clearing point [° C.]: | 79.0 |
| CGU-3-F | 10.00% | Δn [589 nm, 20° C.]: | 0.0941 |
| BCH-3F•F•F | 10.00% | $\gamma_1$ [mPa · s, 20° C.]: | 121 |
| CCP-1F•F•F | 11.00% | d · Δn [µm]: | 0.5 |
| CCP-2F•F•F | 10.00% | Twist [°]: | 90 |
| CCP-3F•F•F | 9.00% | $V_{10,0,20}$ [V]: | 1.40 |
| CCP-30CF$_3$ | 8.00% | | |
| CCP-40CF$_3$ | 8.00% | | |
| CCP-50CF$_3$ | 3.00% | | |
| CCP-V-1 | 12.00% | | |

Example M33

| | |
|---|---|
| CC-3-V | 10.00% |
| CCP-30CF$_3$ | 5.00% |
| CCP-2F•F•F | 11.00% |
| CGU-2-F | 11.00% |
| PGU-2-F | 5.00% |
| CCZU-2-F | 5.00% |
| CCZU-3-F | 15.00% |
| CCZU-5-F | 5.00% |
| CGZP-2-OT | 11.00% |
| CGZP-3-OT | 9.00% |
| CCP-1F•F•F | 12.00% |
| CCH-35 | 1.00% |

Example M34

| | | | |
|---|---|---|---|
| CC-3-V | 7.00% | Clearing point [° C.]: | 81.0 |
| CCP-30CF$_3$ | 3.00% | Δn [589 nm, 20° C.]: | 0.0878 |
| CCP-20CF$_3$•F | 9.00% | Δε [kHz, 20° C.]: | 11.9 |
| CCP-2F•F•F | 11.00% | $\gamma_1$ [mPa · s, 20° C.]: | 136 |
| CGU-2-F | 10.00% | d · Δn [µm]: | 0.5 |
| PGU-2-F | 4.00% | Twist [°]: | 90 |
| CCZU-2-F | 5.00% | $V_{10,0,20}$ [V]: | 0.98 |
| CCZU-3-F | 15.00% | | |
| CCZU-5-F | 4.00% | | |
| CGZP-2-OT | 11.00% | | |
| CGZP-3-OT | 9.00% | | |
| CCP-1F•F•F | 12.00% | | |

Example M35

| | | | |
|---|---|---|---|
| CCH-35 | 5.00% | S → N [° C.]: | <−40 |
| CCH-3CF$_3$ | 6.00% | Clearing point [° C.]: | 69.5 |
| CCP-20CF$_3$ | 8.00% | Δn [589 nm, 20° C.]: | 0.0896 |
| CCP-30CF$_3$ | 8.00% | $\gamma_1$ [mPa · s, 20° C.]: | 130 |
| CCP-1F•F•F | 12.00% | d · Δn [µm]: | 0.5 |
| CCP-2F•F•F | 6.00% | Twist [°]: | 90 |
| CGU-2-F | 11.00% | $V_{10,0,20}$ [V]: | 1.07 |
| CCZU-2-F | 5.00% | | |
| CCZU-3-F | 15.00% | | |
| CCZU-5-F | 4.00% | | |
| PGU-2-F | 8.00% | | |
| CGZP-2-OT | 10.00% | | |
| CBC-33 | 2.00% | | |

Example M36

| | |
|---|---|
| CCP-1F•F•F | 10.00% |
| CCP-2F•F•F | 4.00% |
| CCZU-2-F | 4.00% |
| CCZU-3-F | 13.00% |
| CCP-30CF$_3$ | 8.00% |
| CGZP-2-OT | 10.00% |
| PGU-2-F | 5.00% |
| CC-5-V | 11.00% |
| CC-3-V1 | 11.00% |
| CCH-35 | 4.50% |
| CC-3-V | 18.00% |
| CBC-33 | 1.50% |

Example M37

| | | | |
|---|---|---|---|
| CCP-1F•F•F | 11.00% | S → N [° C.]: | <−20 |
| CCZU-2-F | 4.00% | Clearing point [° C.]: | 77.5 |
| CCZU-3-F | 13.00% | Δn [589 nm, 20° C.]: | 0.0773 |
| CCP-30CF$_3$ | 8.00% | $\gamma_1$ [mPa · s, 20° C.]: | 63 |
| CGZP-2-OT | 11.00% | d · Δn [µm]: | 0.5 |
| PGU-2-F | 5.00% | Twist [°]: | 90 |
| CC-5-V | 12.00% | $V_{10,0,20}$ [V]: | 1.80 |
| CC-3-V1 | 11.00% | | |
| CCH-35 | 4.00% | | |
| CC-3-V | 18.00% | | |
| CCP-V-1 | 3.00% | | |

Example M38

| | | | |
|---|---|---|---|
| CC-5-V | 12.00% | S → N [° C.]: | <−20 |
| CC-3-V1 | 11.00% | Clearing point [° C.]: | 77.0 |
| CCH-35 | 5.00% | Δn [589 nm, 20° C.]: | 0.0773 |
| CC-3-V | 18.00% | Δε [kHz, 20° C.]: | 6.0 |
| CCH-3CF$_3$ | 2.00% | $\gamma_1$ [mPa · s, 20° C.]: | 63 |
| CCP-1F•F•F | 10.50% | d · Δn [µm]: | 0.5 |
| CCZU-3-F | 11.50% | Twist [°]: | 90 |
| CCP-30CF$_3$ | 8.00% | $V_{10,0,20}$ [V]: | 1.84 |
| CGZP-2-OT | 10.50% | | |
| CGZP-3-OT | 5.50% | | |
| PGU-2-F | 4.00% | | |
| CCP-V-1 | 2.00% | | |

Example M39

| | | | |
|---|---|---|---|
| CCP-1F•F•F | 12.00% | S → N [° C.]: | <−40 |
| CCP-2F•F•F | 6.50% | Clearing point [° C.]: | 80.0 |
| CCP-20CF$_3$•F | 11.00% | Δn [589 nm, 20° C.]: | 0.0930 |
| CCP-30CF$_3$•F | 11.00% | d · Δn [µm]: | 0.5 |
| CCP-20CF$_3$ | 8.00% | Twist [°]: | 90 |
| CCP-30CF$_3$ | 8.00% | $V_{10,0,20}$ [V]: | 1.32 |
| CCP-40CF$_3$ | 8.00% | | |
| CCP-50CF$_3$ | 7.50% | | |
| CGU-2-F | 10.50% | | |
| CGU-3-F | 9.00% | | |
| CBC-33 | 1.50% | | |
| BCH-3F•F•F | 7.00% | | |

Example M40

| | |
|---|---|
| CCP-1F•F•F | 12.00% |
| CCP-2F•F•F | 11.00% |
| CCP-3F•F•F | 11.00% |
| CCP-20CF$_3$•F | 11.00% |
| CCP-20CF$_3$ | 8.00% |
| CCP-30CF$_3$ | 8.00% |
| CCP-40CF$_3$ | 8.00% |
| CCG-V-F | 15.00% |
| CGU-2-F | 3.00% |
| BCH-3F•F•F | 8.00% |
| BCH-32 | 3.00% |
| CCP-V-1 | 2.00% |

Example M41

| | | | |
|---|---|---|---|
| CC-3-V | 10.00% | Clearing point [° C.]: | 69.0 |
| CCP-30CF$_3$ | 5.00% | Δn [589 nm, 20° C.]: | 0.0875 |
| CCP-20CF$_3$•F | 2.00% | Δε [kHz, 20° C.]: | 12.2 |
| CCP-2F•F•F | 11.00% | γ$_1$ [mPa · s, 20° C.]: | 124 |
| CGU-2-F | 11.00% | d · Δn [μm]: | 0.5 |
| PGU-2-F | 4.00% | Twist [°]: | 90 |
| CCZU-2-F | 5.00% | V$_{10,0,20}$ [V]: | 1.02 |
| CCZU-3-F | 15.00% | | |
| CCZU-5-F | 5.00% | | |
| CGZP-2-OT | 11.00% | | |
| CGZP-3-OT | 9.00% | | |
| CCP-1F•F•F | 12.00% | | |

Example M42

| | | | |
|---|---|---|---|
| CCP-1F•F•F | 12.00% | S → N [° C.]: | <−40 |
| CCP-2F•F•F | 11.00% | Clearing point [° C.]: | 83.0 |
| CCP-3F•F•F | 11.00% | Δn [589 nm, 20° C.]: | 0.0932 |
| CCP-20CF$_3$•F | 11.00% | γ$_1$ [mPa · s, 20° C.]: | 160 |
| CCP-30CF$_3$ | 5.00% | d · Δn [μm]: | 0.5 |
| CCP-20CF$_3$ | 8.00% | Twist [°]: | 90 |
| CCP-30CF$_3$ | 8.00% | V$_{10,0,20}$ [V]: | 1.32 |
| CCP-40CF$_3$ | 3.00% | | |
| CGU-2-F | 10.00% | | |
| CGU-3-F | 10.50% | | |
| CCG-V-F | 1.50% | | |
| CCGU-3-F | 4.00% | | |
| CBC-33 | 3.00% | | |
| BCH-32 | 2.00% | | |

Example M43

| | | | |
|---|---|---|---|
| BCH-3F•F | 10.80% | Clearing point [° C.]: | +92.0 |
| BCH-5F•F | 9.00% | Δn [589 nm, 20° C.]: | 0.0945 |
| ECCP-30CF$_3$ | 4.50% | Δε [1 kHz, 20° C.]: | +5.7 |
| ECCP-50CF$_3$ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.20% | | |
| CCP-50CF$_3$ | 9.90% | | |
| PCH-5F | 9.00% | | |
| CWCQU-1-F | 10.00% | | |

Example M44

| | | | |
|---|---|---|---|
| CC-3-V | 16.00% | Clearing point [° C.]: | 80.6 |
| CCH-35 | 3.00% | Δn [589 nm, 20° C.]: | 0.0794 |
| CCP-1F•F•F | 10.00% | γ$_1$ [mPa · s, 20° C.]: | 117 |
| CCP-2F•F•F | 7.00% | V$_{10,0,20}$ [V]: | 1.22 |
| CCZU-2-F | 4.00% | | |
| CCZU-3-F | 15.00% | | |
| CGZP-2-OT | 10.00% | | |
| CGZP-3-OT | 8.00% | | |
| CGU-3-F | 4.00% | | |
| CWCQU-1-F | 6.00% | | |
| CWCQU-2-F | 6.00% | | |
| CWCQU-3-F | 7.00% | | |
| CCOC-3-3 | 1.00% | | |
| CCH-3CF$_3$ | 3.00% | | |

Example M45

| | | | |
|---|---|---|---|
| CC-3-V | 16.00% | Clearing point [° C.]: | 85.0 |
| CCH-35 | 3.00% | Δn [589 nm, 20° C.]: | 0.0802 |
| CCP-1F•F•F | 10.00% | γ$_1$ [mPa · s, 20° C.]: | 121 |
| CCP-3F•F•F | 7.00% | V$_{10,0,20}$ [V]: | 1.25 |
| CCZU-2-F | 4.00% | | |
| CCZU-3-F | 15.00% | | |
| CGZP-2-OT | 10.00% | | |
| CGZP-3-OT | 8.00% | | |
| CGU-3-F | 4.00% | | |
| CWCQU-1-F | 6.00% | | |
| CWCQU-2-F | 6.00% | | |
| CWCQU-3-F | 7.00% | | |
| CCOC-3-3 | 1.00% | | |
| CCH-3CF$_3$ | 3.00% | | |

Example M46

| | | | |
|---|---|---|---|
| CC-3-V | 9.00% | Clearing point [° C.]: | 70.2 |
| CCP-1F•F•F | 11.00% | Δn [589 nm, 20° C.]: | 0.0892 |
| CCP-2F•F•F | 5.50% | γ$_1$ [mPa · s, 20° C.]: | 143 |
| CCZU-2-F | 4.00% | V$_{10,0,20}$ [V]: | 1.06 |
| CCZU-3-F | 15.00% | | |
| CGZP-2-OT | 10.00% | | |
| CGU-2-F | 9.00% | | |
| PGU-2-F | 2.00% | | |
| PGU-3-F | 8.00% | | |
| CWCQU-1-F | 7.00% | | |
| CWCQU-2-F | 7.00% | | |
| CWCQU-3-F | 7.00% | | |
| CWCQU-5-F | 5.50% | | |

Example M47

| | | | |
|---|---|---|---|
| CCP-20CF₃•F | 7.00% | Clearing point [° C.]: | +85.5 |
| CCP-30CF₃•F | 7.00% | Δn [589 nm, 20° C.]: | 0.0757 |
| CCP-50CF₃•F | 7.00% | V$_{10,0,20}$ [V]: | 1.13 |
| CCP-2F•F•F | 11.00% | | |
| CCP-3F•F•F | 11.00% | | |
| CCP-5F•F•F | 6.00% | | |
| CGU-2-F | 2.00% | | |
| CGU-3-F | 4.00% | | |
| CCOC-4-3 | 2.00% | | |
| CCOC-3-3 | 3.00% | | |
| CWCQU-1-F | 4.00% | | |
| CWCQU-2-F | 6.00% | | |
| CWCQU-3-F | 6.00% | | |
| CDU-2-F | 9.00% | | |
| CDU-3-F | 9.00% | | |
| CDU-5-F | 6.00% | | |

Example M48

| | | | |
|---|---|---|---|
| PGU-2-F | 7.00% | Clearing point [° C.]: | +73.0 |
| PGU-3-F | 2.00% | Δn [589 nm, 20° C.]: | 0.0942 |
| CGZP-2-OT | 5.00% | γ$_1$ [mPa · s, 20° C.]: | 76 |
| CGZP-3-OT | 2.00% | V$_{10,0,20}$ [V]: | 1.59 |
| BCH-3F•F•F | 15.00% | | |
| CCP-1F•F•F | 10.00% | | |
| CCZU-2-F | 3.00% | | |
| CC-3-V1 | 12.00% | | |
| CC-5-V | 15.00% | | |
| CCH-35 | 6.00% | | |
| PCH-302 | 10.00% | | |
| CCP-3F•F | 4.00% | | |
| CWCQU-2-F | 4.00% | | |
| CWCQU-3-F | 5.00% | | |

Example M49

| | | | |
|---|---|---|---|
| CCH-35 | 5.00% | S → N [° C.]: | <−40.0 |
| CC-3-V1 | 12.00% | Clearing point [° C.]: | 83.0 |
| CCP-2F•F•F | 10.00% | Δn [589 nm, 20° C.]: | 0.0946 |
| CCP-20CF₃•F | 12.00% | | |
| CCP-30CF₃•F | 2.00% | | |
| CCP-20CF₃ | 8.00% | | |
| CCP-30CF₃ | 8.00% | | |
| CCP-40CF₃ | 6.00% | | |
| CCP-50CF₃ | 8.00% | | |
| PUQU-1-F | 8.00% | | |
| PUQU-2-F | 6.00% | | |
| PUQU-3-F | 10.00% | | |
| CCGU-3-F | 5.00% | | |

Example M50

| | | | |
|---|---|---|---|
| CCH-35 | 5.00% | S → N [° C.]: | <−40.0 |
| CC-3-V1 | 11.00% | Clearing point [° C.]: | 84.0 |
| CCP-2F•F•F | 10.00% | Δn [589 nm, 20° C.]: | 0.0934 |
| CCP-3F•F•F | 2.00% | γ$_1$ [mPa · s, 20° C.]: | 113 |
| CCP-20CF₃•F | 12.00% | V$_{10,0,20}$ [V]: | 1.30 |
| CCP-30CF₃•F | 6.00% | | |
| CCP-20CF₃ | 8.00% | | |
| CCP-30CF₃ | 8.00% | | |
| CCP-40CF₃ | 6.00% | | |
| CCP-50CF₃ | 5.00% | | |
| PUQU-1-F | 8.00% | | |
| PUQU-2-F | 6.00% | | |
| PUQU-3-F | 8.00% | | |
| CCGU-3-F | 5.00% | | |

Example M51

| | | | |
|---|---|---|---|
| CCH-35 | 5.00% | S → N [° C.]: | <−40.0 |
| CC-5-V | 5.00% | Clearing point [° C.]: | 84.0 |
| CCP-2F•F•F | 10.00% | Δn [589 nm, 20° C.]: | 0.0940 |
| CCP-3F•F•F | 2.00% | Δε [1 kHz, 20° C.]: | 11.9 |
| CCP-20CF₃•F | 12.00% | K$_3$/K$_1$ [pN, 20° C.]: | 1.34 |
| CCP-30CF₃•F | 12.00% | γ$_1$ [mPa · s, 20° C.]: | 127 |
| CCP-20CF₃ | 8.00% | V$_{10,0,20}$ [V]: | 1.24 |
| CCP-30CF₃ | 8.00% | | |
| CCP-40CF₃ | 6.00% | | |
| CCP-50CF₃ | 5.00% | | |
| PUQU-1-F | 8.00% | | |
| PUQU-2-F | 6.00% | | |
| PUQU-3-F | 8.00% | | |
| CCGU-3-F | 5.00% | | |

Example M52

| | | | |
|---|---|---|---|
| CCP-1F•F•F | 5.00% | Clearing point [° C.]: | 77.0 |
| CCZU-2-F | 4.00% | | |
| CCZU-3-F | 9.00% | | |
| CCP-20CF₃ | 8.00% | | |
| CCP-30CF₃ | 8.00% | | |
| PUQU-1-F | 8.00% | | |
| PUQU-2-F | 6.00% | | |
| CC-5-V | 5.00% | | |
| CC-3-V1 | 12.00% | | |
| CCH-35 | 5.00% | | |
| CC-3-V | 20.00% | | |
| CCP-V-1 | 10.00% | | |

Example M53

| | | | |
|---|---|---|---|
| CCP-1F•F•F | 4.00% | Clearing point [° C.]: | 76.0 |
| CCZU-2-F | 4.00% | | |
| CCZU-3-F | 9.00% | | |
| CCP-20CF₃ | 8.00% | | |
| CCP-30CF₃ | 8.00% | | |
| PUQU-1-F | 8.00% | | |
| PUQU-2-F | 6.00% | | |
| CC-5-V | 11.00% | | |
| CC-3-V1 | 12.00% | | |
| CC-3-V | 20.00% | | |
| CCP-V-1 | 10.00% | | |

Example M54

| | |
|---|---|
| CQU-1-F | 8.50% |
| CCZU-3-F | 11.00% |
| CCP-20CF$_3$ | 8.00% |
| CCP-30CF$_3$ | 8.00% |
| CCP-40CF$_3$ | 6.00% |
| CGZP-2-OT | 6.00% |
| CGZP-3-OT | 3.00% |
| PGU-2-F | 5.50% |
| CC-5-V | 9.00% |
| CC-3-V1 | 12.00% |
| CCH-35 | 5.00% |
| CC-3-V | 18.00% |

Example M55

| | |
|---|---|
| CQU-1-F | 10.00% |
| CQU-2-F | 1.50% |
| CCP-2F•F•F | 10.00% |
| CCP-20CF$_3$ | 8.00% |
| CCP-30CF$_3$ | 7.00% |
| CCP-40CF$_3$ | 6.00% |
| CCP-20CF$_3$•F | 3.00% |
| CCZU-2-F | 4.00% |
| CCZU-3-F | 15.00% |
| CCZU-5-F | 4.00% |
| CGZP-2-OT | 10.00% |
| CGZP-3-OT | 8.00% |
| PGU-2-F | 3.00% |
| CGU-2-F | 6.50% |
| CCGU-3-F | 4.00% |

Example M56

| | |
|---|---|
| CC-3-V | 14.00% |
| CCP-1F•F•F | 6.00% |
| CCP-2F•F•F | 2.00% |
| CCP-30CF$_3$ | 8.00% |
| CCP-40CF$_3$ | 5.00% |
| CCZU-2-F | 4.00% |
| CCZU-3-F | 15.00% |
| CCZU-5-F | 4.00% |
| CGZP-2-OT | 10.00% |
| CGZP-3-OT | 8.00% |
| CQU-1-F | 7.00% |
| CQU-2-F | 7.00% |
| CCOC-4-3 | 2.50% |
| CCGU-3-F | 5.00% |
| CBC-33 | 2.50% |

Example M57

| | |
|---|---|
| CC-3-V1 | 10.00% |
| CCP-1F•F•F | 8.00% |
| CCP-20CF$_3$ | 8.00% |
| CCP-30CF$_3$ | 8.00% |
| CCP-40CF$_3$ | 5.00% |
| CCP-20CF$_3$•F | 4.00% |
| CCZU-2-F | 3.00% |

-continued

| | |
|---|---|
| CCZU-3-F | 15.00% |
| CCZU-5-F | 4.00% |
| CGZP-2-OT | 10.00% |
| CGZP-3-OT | 8.00% |
| CQU-1-F | 10.00% |
| CQU-2-F | 4.00% |
| CCOC-3-3 | 1.00% |
| CBC-33 | 2.00% |

Example M58

| | | | |
|---|---|---|---|
| CCH-5CF$_3$ | 4.00% | Clearing point [° C.]: | 89.0 |
| CCP-20CF$_3$•F | 12.00% | Δn [589 nm, 20° C.]: | 0.0800 |
| CCP-30CF$_3$•F | 12.00% | V$_{10,0,20}$ [V]: | 1.18 |
| CCP-50CF$_3$•F | 12.00% | | |
| CGU-2-F | 7.00% | | |
| CGU-3-F | 4.00% | | |
| CCOC-3-3 | 2.00% | | |
| CCOC-4-3 | 2.00% | | |
| CCQU-1-F | 12.00% | | |
| CCQU-2-F | 10.00% | | |
| CCQU-3-F | 12.00% | | |
| CCQU-5-F | 8.00% | | |
| CCGU-3-F | 3.00% | | |

Example M59

| | | | |
|---|---|---|---|
| PGU-2-F | 8.00% | S → N [° C.]: | <−20.0 |
| PGU-3-F | 3.50% | Clearing point [° C.]: | 75.0 |
| CCP-20CF$_3$ | 8.00% | Δn [589 nm, 20° C.]: | 0.0918 |
| CCP-30CF$_3$ | 7.00% | γ$_1$ [mPa·s, 20° C.]: | 80 |
| CGU-2-F | 10.00% | V$_{10,0,20}$ [V]: | 1.46 |
| CCQU-1-F | 7.00% | | |
| CCQU-2-F | 7.00% | | |
| CCQU-3-F | 5.00% | | |
| CC-3-V1 | 11.00% | | |
| CC-5-V | 13.00% | | |
| CCH-35 | 5.00% | | |
| BCH-32 | 3.50% | | |
| CCG-V-F | 12.00% | | |

Example M60

| | | | |
|---|---|---|---|
| CCP-1F•F•F | 9.00% | S → N [° C.]: | <−40.0 |
| CCP-2F•F•F | 9.00% | Clearing point [° C.]: | 82.5 |
| CCP-3F•F•F | 3.00% | Δn [589 nm, 20° C.]: | 0.0918 |
| CCQU-1-F | 8.00% | γ$_1$ [mPa·s, 20° C.]: | 139 |
| CCQU-2-F | 8.00% | V$_{10,0,20}$ [V]: | 1.20 |
| CCQU-3-F | 8.00% | | |
| CCP-20CF$_3$ | 8.00% | | |
| CCP-30CF$_3$ | 8.00% | | |
| CCP-40CF$_3$ | 6.00% | | |
| CCP-50CF$_3$ | 3.00% | | |
| CGU-2-F | 10.00% | | |
| PGU-2-F | 7.00% | | |
| CCP-V-1 | 4.00% | | |
| CBC-33 | 0.50% | | |
| CCGU-3-F | 4.00% | | |
| CC-3-V1 | 4.50% | | |

Example M61

| | | | |
|---|---|---|---|
| CCP-2F•F•F | 9.00% | S → N [° C.]: | <−40.0 |
| CCP-3F•F•F | 9.00% | Clearing point [° C.]: | 82.5 |
| CCQU-1-F | 9.00% | Δn [589 nm, 20° C.]: | 0.0917 |
| CCQU-2-F | 9.00% | γ₁ [mPa·s, 20° C.]: | 149 |
| CCQU-3-F | 9.00% | $V_{10,0,20}$ [V]: | 1.28 |
| CCP-2OCF₃ | 8.00% | | |
| CCP-3OCF₃ | 8.00% | | |
| CCP-4OCF₃ | 6.00% | | |
| CCP-5OCF₃ | 4.00% | | |
| CGU-2-F | 10.00% | | |
| CGU-3-F | 9.00% | | |
| BCH-3F•F•F | 4.00% | | |
| CBC-33 | 1.50% | | |
| BCH-32 | 4.50% | | |

Example M62

| | | | |
|---|---|---|---|
| CC-3-V1 | 5.00% | Clearing point [° C.]: | 78.0 |
| CCH-35 | 3.00% | γ₁ [mPa·s, 20° C.]: | 149 |
| CCP-3OCF₃ | 5.00% | $V_{10,0,20}$ [V]: | 1.03 |
| CCZU-2-F | 5.00% | | |
| CCZU-3-F | 15.00% | | |
| CGZP-2-OT | 9.00% | | |
| CGZP-3-OT | 7.00% | | |
| CGU-2-F | 10.00% | | |
| CGU-3-F | 10.00% | | |
| CCQU-1-F | 10.00% | | |
| CCQU-2-F | 10.00% | | |
| CCQU-3-F | 11.00% | | |

Example M63

| | | | |
|---|---|---|---|
| CCH-34 | 5.00% | Clearing point [° C.]: | 82.0 |
| ECCP-3F•F•F | 14.00% | Δn [589 nm, 20° C.]: | 0.088 |
| PUQU-1-F | 7.00% | γ₁ [mPa·s, 20° C.]: | 135 |
| PUQU-2-F | 6.00% | $V_{10,0,20}$ [V]: | 1.3 |
| PUQU-3-F | 6.00% | | |
| CCP-2F•F | 9.00% | | |
| CCP-3F•F | 12.00% | | |
| CCP-5F•F | 12.00% | | |
| CCP-1F•F•F | 3.00% | | |
| CCP-2F•F•F | 9.00% | | |
| CCP-3F•F•F | 8.00% | | |
| CCP-31 | 9.00% | | |

Example M64

| | | | |
|---|---|---|---|
| CCH-34 | 5.00% | Clearing point [° C.]: | 82.0 |
| CCZU-1-F | 3.00% | Δn [589 nm, 20° C.]: | 0.087 |
| CCZU-2-F | 3.00% | γ₁ [mPa·s, 20° C.]: | 130 |
| CCZU-3-F | 8.00% | $V_{10,0,20}$ [V]: | 1.3 |
| PUQU-1-F | 7.00% | | |
| PUQU-2-F | 6.00% | | |
| PUQU-3-F | 6.00% | | |
| CCP-2F•F | 12.00% | | |
| CCP-3F•F | 12.00% | | |
| CCP-5F•F | 9.00% | | |
| CCP-1F•F•F | 3.00% | | |
| CCP-2F•F•F | 9.00% | | |
| CCP-3F•F•F | 8.00% | | |
| CCP-31 | 9.00% | | |

Example M65

| | | | |
|---|---|---|---|
| CCH-34 | 5.00% | Clearing point [° C.]: | 82.0 |
| CPZU-1-F | 2.00% | Δn [589 nm, 20° C.]: | 0.087 |
| CPZU-2-F | 2.00% | γ₁ [mPa·s, 20° C.]: | 150 |
| CPZU-3-F | 2.00% | $V_{10,0,20}$ [V]: | 1.3 |
| CPZU-5-F | 2.00% | | |
| CCZU-1-F | 3.00% | | |
| CCZU-2-F | 3.00% | | |
| CCZU-3-F | 8.00% | | |
| CCZU-4-F | 3.00% | | |
| BCH-3F•F•F | 17.00% | | |
| CCQU-1-F | 7.00% | | |
| CCQU-2-F | 7.00% | | |
| CCQU-3-F | 7.00% | | |
| CCP-1F•F•F | 6.00% | | |
| CCP-2F•F•F | 7.00% | | |
| CCP-3F•F•F | 7.00% | | |
| CCP-4F•F•F | 4.00% | | |
| CCP-31 | 8.00% | | |

Example M66

| | | | |
|---|---|---|---|
| PCH-7F | 5.00% | Clearing point [° C.]: | 85.0 |
| BCH-1F•F•F | 10.00% | Δn [589 nm, 20° C.]: | 0.093 |
| BCH-3F•F•F | 13.00% | γ₁ [mPa·s, 20° C.]: | 165 |
| ECCP-3F•F•F | 16.00% | $V_{10,0,20}$ [V]: | 1.6 |
| CCP-1F•F | 5.00% | | |
| CCP-2F•F | 5.00% | | |
| CCP-3F•F | 14.00% | | |
| CCP-4F•F | 14.00% | | |
| CCP-5F•F | 14.00% | | |
| CCP-31 | 4.00% | | |

Example M67

| | | | |
|---|---|---|---|
| CCH-34 | 13.00% | Clearing point [° C.]: | 80.0 |
| CCH-25 | 10.00% | Δn [589 nm, 20° C.]: | 0.081 |
| PCH-302 | 5.00% | γ₁ [mPa·s, 20° C.]: | 90 |
| PCH-5Cl | 18.00% | $V_{10,0,20}$ [V]: | 1.8 |
| CCP-3F | 4.00% | | |
| CCP-3Cl | 8.00% | | |
| CCP-31 | 12.00% | | |
| CCP-1F•F•F | 4.00% | | |
| CCP-3F•F•F | 4.00% | | |
| CPZU-1-F | 2.00% | | |
| CPZU-2-F | 2.00% | | |
| CPZU-3-F | 2.00% | | |
| CPZU-5-F | 2.00% | | |
| CCZU-1-F | 4.00% | | |
| CCZU-3-F | 6.00% | | |
| CCZU-4-F | 2.00% | | |
| CCZU-5-F | 2.00% | | |

Example M68

| | | | |
|---|---|---|---|
| CCH-34 | 12.00% | Clearing point [° C.]: | 90.0 |
| DCU-3-F | 2.00% | Δn [589 nm, 20° C.]: | 0.093 |
| DCU-4-F | 5.00% | $\gamma_1$ [mPa · s, 20° C.]: | 180 |
| DCU-5-F | 8.00% | $V_{10,0,20}$ [V]: | 1.3 |
| CCP-1F•F•F | 7.00% | | |
| CCP-2F•F•F | 3.00% | | |
| CCP-31 | 10.50% | | |
| BCH-3F•F•F | 20.00% | | |
| BCH-5F•F•F | 6.50% | | |
| CCZU-1-F | 3.00% | | |
| CCZU-2-F | 3.00% | | |
| CCZU-3-F | 9.00% | | |
| CCZU-5-F | 3.00% | | |
| CCPU-3-F | 5.00% | | |
| CCPU-5-F | 3.00% | | |

Example M69

| | | | |
|---|---|---|---|
| CCH-34 | 4.00% | Clearing point [° C.]: | 82.0 |
| CPZU-2-F | 2.70% | Δn [589 nm, 20° C.]: | 0.087 |
| CPZU-3-F | 2.50% | $\gamma_1$ [mPa · s, 20° C.]: | 185 |
| CPZU-5-F | 2.80% | $V_{10,0,20}$ [V]: | 1.3 |
| CCZU-1-F | 3.00% | | |
| CCZU-2-F | 3.00% | | |
| CCZU-3-F | 9.00% | | |
| CCZU-4-F | 3.00% | | |
| BCH-3F•F•F | 14.00% | | |
| CCP-1F•F•F | 8.00% | | |
| CCP-2F•F•F | 6.00% | | |
| ECCP-3F•F•F | 18.00% | | |
| ECCP-5F•F•F | 9.00% | | |
| CECU-3-F | 10.00% | | |
| CCP-31 | 5.00% | | |

Example M70

| | | | |
|---|---|---|---|
| BCH-3F•F | 10.79% | Clearing point [° C.]: | 87.3 |
| BCH-5F•F | 8.99% | Δn [589 nm, 20° C.]: | 0.0934 |
| ECCP-30CF$_3$ | 4.49% | Δε [1 kHz, 20° C.]: | 5.3 |
| ECCP-50CF$_3$ | 4.49% | | |
| CBC-33F | 1.80% | | |
| CBC-53F | 1.80% | | |
| CBC-55F | 1.80% | | |
| PCH-6F | 7.19% | | |
| PCH-7F | 5.39% | | |
| CCP-20CF$_3$ | 7.19% | | |
| CCP-30CF$_3$ | 10.79% | | |
| CCP-40CF$_3$ | 6.29% | | |
| CCP-50CF$_3$ | 9.89% | | |
| PCH-5F | 8.99% | | |
| CECG-1-F | 10.11% | | |

Example M71

| | | | |
|---|---|---|---|
| BCH-3F•F | 10.80% | Clearing point [° C.]: | 98.6 |
| BCH-5F•F | 9.00% | Δn [589 nm, 20° C.]: | 0.1023 |
| ECCP-30CF$_3$ | 4.50% | Δε [1 kHz, 20° C.]: | 6.3 |
| ECCP-50CF$_3$ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| CCGU-1-F | 10.00% | | |

Example M72

| | | | |
|---|---|---|---|
| BCH-3F•F | 10.80% | Clearing point [° C.]: | 98.6 |
| BCH-5F•F | 9.00% | $\gamma_1$ [mPa · s, 20° C.]: | 157 |
| ECCP-30CF$_3$ | 4.50% | | |
| ECCP-50CF$_3$ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| CCGU-1-F | 10.00% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium consisting of:
one or more compounds of the formula I

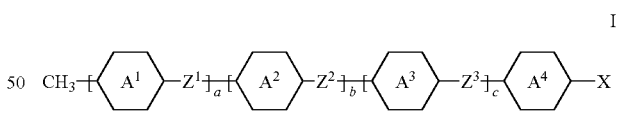

in which

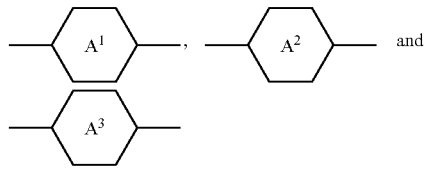

are a) a 1,4-cyclohexenylene or 1,4-cyclohexylene radical, in which one or two non-adjacent CH$_2$ groups are optionally replaced by —O— or —S—, b) a 1,4-phenylene radical, in which one or two CH groups are optionally replaced by N,
c) a radical selected from the group consisting of piperidine-1,4-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl,
where the radicals a), b) and c) are optionally monosubstituted or polysubstituted by halogen atoms,

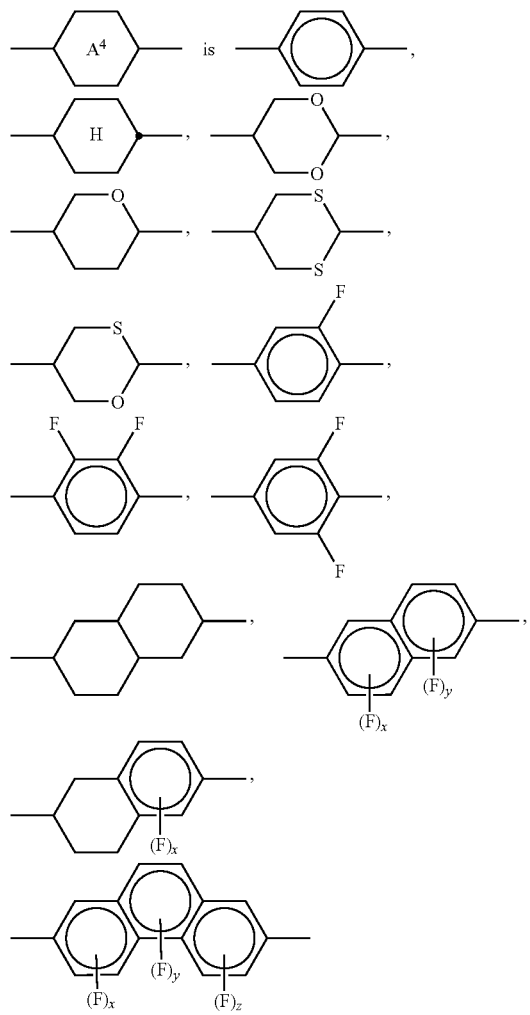

x, y and z are each, independently of one another, 0, 1 or 2, provided that the compound has at least one ring $A^1$ to $A^4$ which is a 2,3-difluoro-1,4-phenylene ring,
$Z^1$, $Z^2$ and $Z^3$ are each, independently of one another, —CO—O—, —O—CO—, —CF$_2$O—, —OCF$_2$—, —CH$_2$O—, —OCH$_2$—, —CH$_2$CH$_2$—, —(CH$_2$)$_4$—, —C$_2$F$_4$—, —CH$_2$CF$_2$—, —CF$_2$CH$_2$—, —CF=CF—, —CH=CH—, —C≡C— or a single bond,
X is F, Cl, CN, SF$_5$, NCS, a halogenated or unsubstituted alkyl radical having 1 to 8 carbon atoms, in which one or more CH$_2$ groups are optionally replaced by —O— or —CH=CH— in such a way that O atoms are not linked directly to one another,
a is 0, 1 or 2,
b is 0, 1 or 2, and
c is 0, 1 or 2,
where a+b+c is from 1 to 3; and additionally consisting of at least one compound of the formula RVIII:

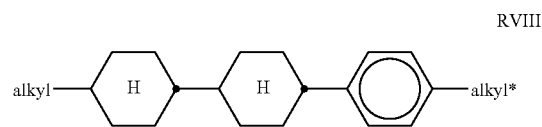

RVIII in which
alkyl and alkyl* are each, independently of one another, a straight-chain or branched alkyl radical having from 2 to 8 carbon atoms;
optionally, further containing one or more compounds of the formulae RI to RVII, RIX to RXII or RXIV:

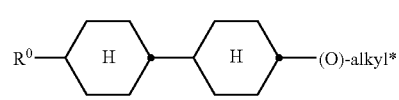

RI

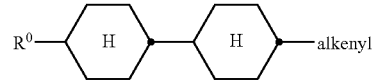

RII

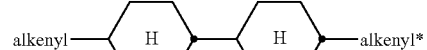

RIII

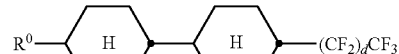

RIV

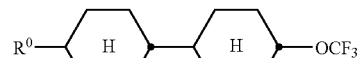

RV

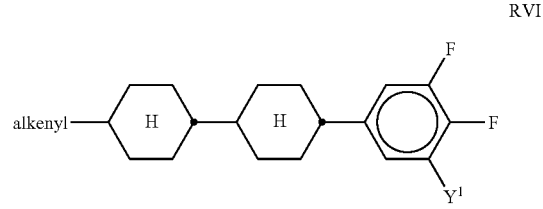

RVI

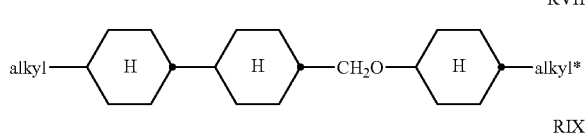

RVII

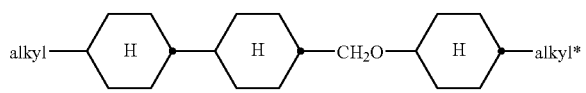

RIX

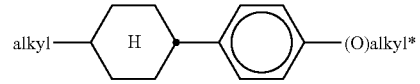

RX

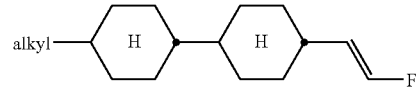

RXI

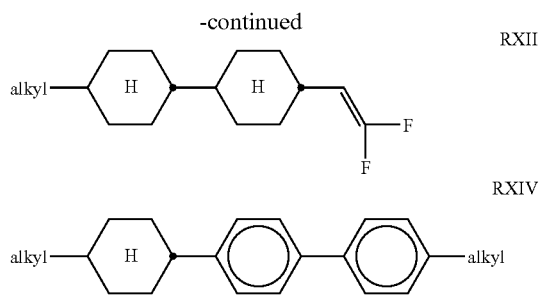

in which
- $R^0$ is n-alkyl, oxaalkyl, fluoroalkyl, alkenyloxy or alkenyl, each having from 2 to 8 carbon atoms,
- d is 0, 1 or 2,
- $Y^1$ is H or F,
- alkyl and alkyl* are each, independently of one another, a straight-chain or branched alkyl radical having from 2 to 8 carbon atoms, and
- alkenyl and alkenyl* are each, independently of one another, a straight-chain or branched alkenyl radical having from 2 to 8 carbon atoms;

optionally, further containing one or more compounds of the formulae II to XX:

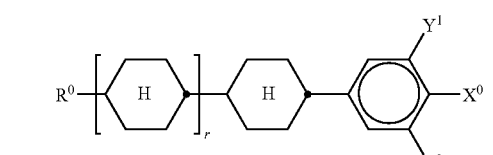

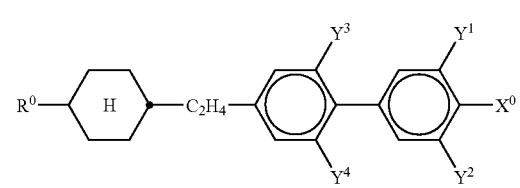

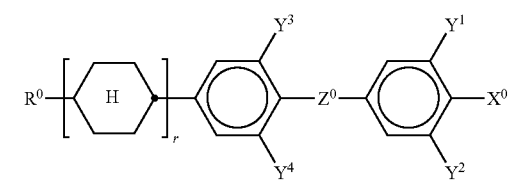

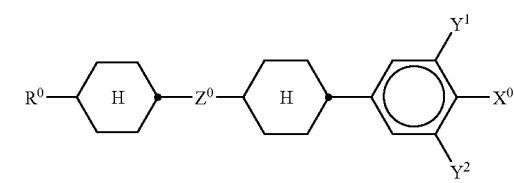

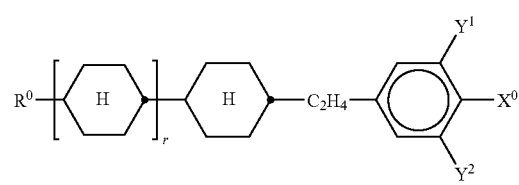

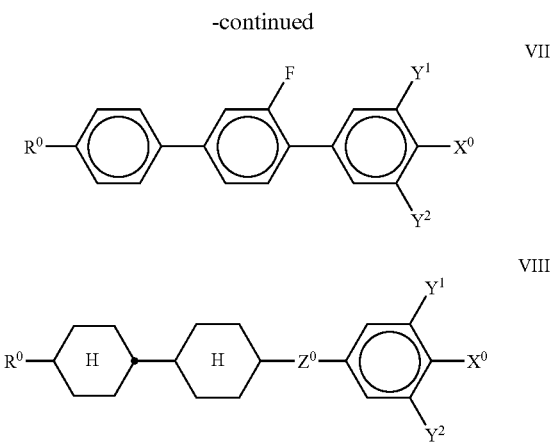

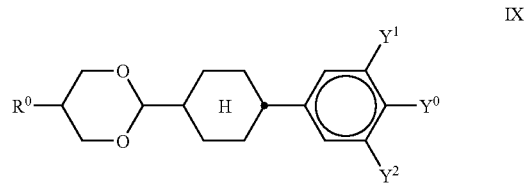

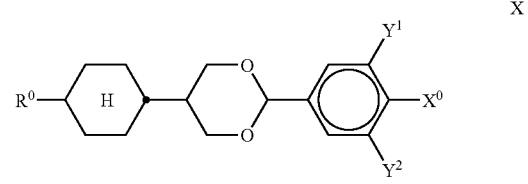

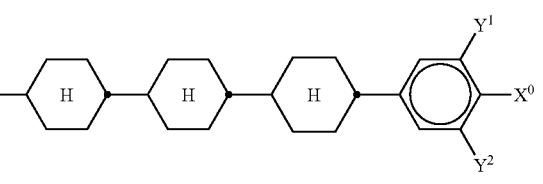

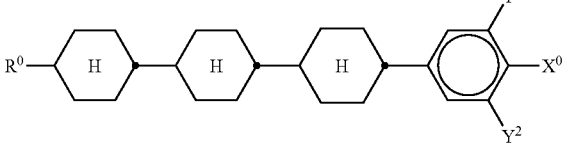

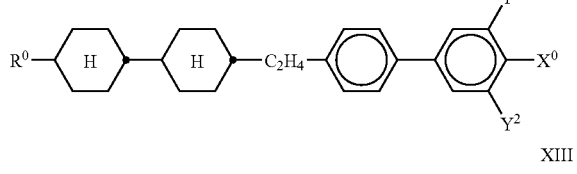

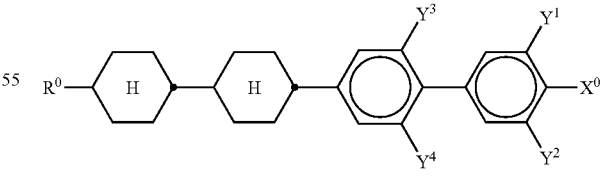

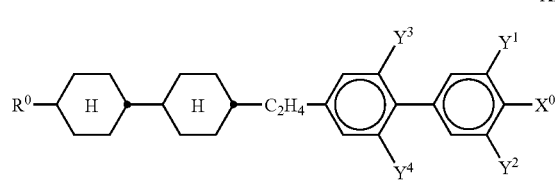

-continued

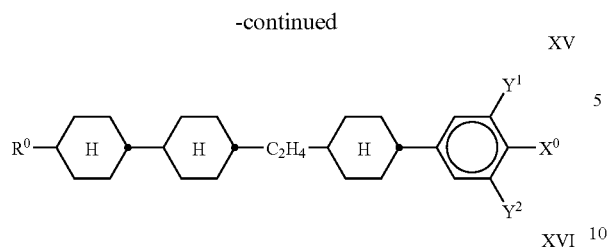

XV

XVI

XVII

XVIII

XIX

XX wherein
R⁰ is n-alkyl, oxaalkyl, fluoroalkyl, alkenyloxy or alkenyl, each having from 2 to 12 carbon atoms,
X⁰ is F, Cl, halogenated alkyl, halogenated alkenyl, halogenated alkenyloxy or halogenated alkoxy each having up to 8 carbon atoms,
Z⁰ is —CH=CH—, —C₂H₄—, —CH₂O—, —OCH₂—, —(CH₂)₄—, —C₂F₄—, —CF=CF—, —CF₂O—, —OCF₂— or —COO—,
Y¹, Y², Y³ and Y⁴ are each, independently of one another, H or F, and
r is 0 or 1; and
optionally, further containing one or more compounds of the formula DI or DII:

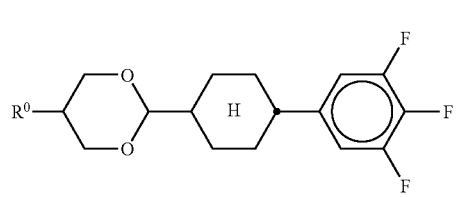

DI

-continued

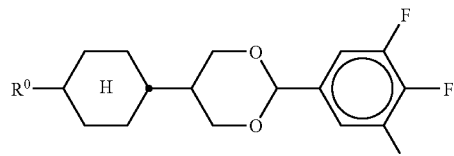

DII wherein R⁰ is as defined above.

2. A liquid-crystalline medium according to claim 1, wherein the medium has a clearing point of >80° C.

3. A liquid-crystalline medium according to claim 1, wherein X in the formula I is selected from:
CH₃, C₂H₅ and n-C₃H₇.

4. A liquid-crystalline medium according to claim 1, which contains one or more compounds of the formulae RI to RVII, RIX to RXII or RXIV:

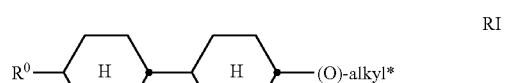

RI

RII

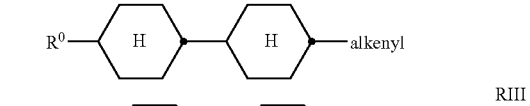

RIII

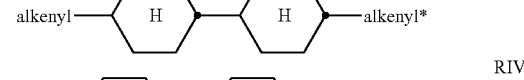

RIV

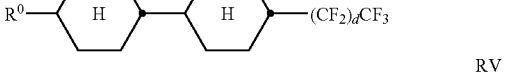

RV

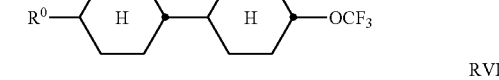

RVI

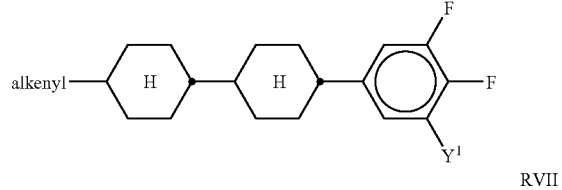

RVII

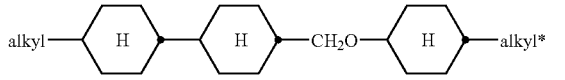

RIX

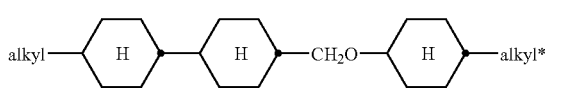

RX

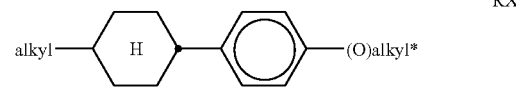

RXI

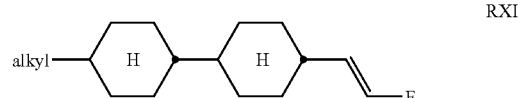

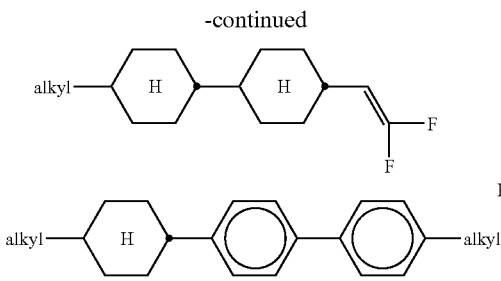

in which
R⁰ is n-alkyl, oxaalkyl, fluoroalkyl, alkenyloxy or alkenyl, each having from 2 to 8 carbon atoms,
d is 0, 1 or 2,
$Y^1$ is H or F,
alkyl and alkyl* are each, independently of one another, a straight-chain or branched alkyl radical having from 2 to 8 carbon atoms,
alkenyl and alkenyl* are each, independently of one another, a straight-chain or branched alkenyl radical having from 2 to 8 carbon atoms.

5. An electro-optical liquid-crystal display containing a liquid-crystalline medium according to claim 1.

6. The liquid-crystalline medium of claim 1, wherein the medium exhibits a flow viscosity, $v_{20}$, at 20° C. of <60 mm²·s⁻¹ and a nematic phase range of at least 90° C.

7. The liquid-crystalline medium of claim 1, wherein the proportion of compounds of formula I in the medium is from 5 to 50% by weight.

8. A liquid-crystalline medium according to claim 1, comprising at least one compound of formula I selected from the compounds of subformulae Ia to Im:

| | |
|---|---|
| CH₃-A¹-A⁴-X | Ia |
| CH₃-A1-Z¹-A⁴-X | Ib |
| CH₃-A¹-A²-A⁴-X | Ic |
| CH₃-A¹-Z¹-A²-A⁴-X | Id |
| CH₃-A¹-Z¹-A²-Z²-A⁴-X | Ie |
| CH₃-A¹-A²-Z²-A⁴-X | If |
| CH₃-A¹-A²-A³-A⁴-X | Ig |
| CH₃-A¹-Z¹-A²-A³-A⁴-X | Ih |
| CH₃-A¹-A²-Z²-A³-A⁴-X | Ii |
| CH₃-A¹-A²A³-Z³-A⁴-X | Ij |
| CH₃-A¹-Z¹-A²-Z²-A³-A⁴-X | Ik |
| CH₃-A¹-Z¹-A²-A³-Z³-A⁴-X | Il |
| CH₃-A¹-A²-Z²-A³-Z³-A⁴-X | Im | where $A^1$, $A^2$, $A^3$ and $A^4$, X, $Z^1$, $Z^2$ and $Z^3$ are as defined in claim 1.

9. A liquid-crystalline medium according to claim 8, comprising at least one compound of formula I selected from the compounds of subformulae Ic, Id, and Ie.

10. A liquid-crystalline medium according to claim 1, wherein, in formula RVIII, alkyl and alkyl* are each, independently of one another, a straight-chain alkyl radical having from 2 to 8 carbon atoms.

11. A liquid-crystalline medium according to claim 1, comprising at least one compound of formula I selected from the compounds of subformulae Ia:

CH₃-A¹-A⁴-X    Ia where $A^1$, $A^4$, and X are as defined in claim 1.

12. A liquid-crystalline medium according to claim 1, wherein X in formula I is an unsubstituted alkyl radical having 1 to 8 carbon atoms, in which one or more CH₂ groups are optionally replaced by —O— or —CH═CH— in such a way that O atoms are not linked directly to one another.

* * * * *